US011865054B1

(12) United States Patent
Golden, Jr.

(10) Patent No.: US 11,865,054 B1
(45) Date of Patent: Jan. 9, 2024

(54) WHEELCHAIR MOUNT APPARATUS

(71) Applicant: Stephen C Golden, Jr., Menasha, WI (US)

(72) Inventor: Stephen C Golden, Jr., Menasha, WI (US)

( * ) Notice: Subject to any disclaimer, the term of this patent is extended or adjusted under 35 U.S.C. 154(b) by 377 days.

(21) Appl. No.: 17/176,324

(22) Filed: Feb. 16, 2021

Related U.S. Application Data

(60) Provisional application No. 62/977,885, filed on Feb. 18, 2020.

(51) Int. Cl.
*A61G 5/10* (2006.01)

(52) U.S. Cl.
CPC .................................... *A61G 5/10* (2013.01)

(58) Field of Classification Search
CPC ................................ A61G 5/10; A61G 5/1094
See application file for complete search history.

(56) References Cited

U.S. PATENT DOCUMENTS

| | | | |
|---|---|---|---|
| 3,999,798 A | 12/1976 | Roulier | |
| 4,174,866 A | 11/1979 | Rhyan | |
| 4,458,870 A | 7/1984 | Duncan et al. | |
| 4,580,803 A | 4/1986 | Davis | |
| 4,913,393 A | 4/1990 | Wood | |
| 5,040,813 A | 8/1991 | Cumbie | |
| 5,139,309 A | 8/1992 | Komreich | |
| 5,246,240 A | 11/1993 | Romich et al. | |
| 5,303,945 A | 4/1994 | Oxford | |
| 5,356,059 A | 10/1994 | Yawz et al. | |
| 5,501,480 A | 3/1996 | Ordelman et al. | |
| 5,597,148 A * | 1/1997 | Gospodarich | A47G 23/0225 297/188.21 |
| 6,123,306 A * | 9/2000 | Jackson | F16M 11/28 248/296.1 |
| 6,138,970 A | 10/2000 | Sohrt et al. | |
| 6,270,105 B1 | 8/2001 | Friedrich | |
| 6,302,429 B1 | 10/2001 | Friedrich | |
| 6,390,426 B1 | 5/2002 | Berry | |
| 6,511,131 B1 | 1/2003 | Harnois | |
| 7,210,736 B1 | 5/2007 | Large | |
| 7,216,929 B2 | 5/2007 | Lang et al. | |
| 7,229,084 B2 | 6/2007 | McKellar | |
| 7,500,689 B2 | 3/2009 | Pasternak et al. | |
| 7,647,873 B1 | 1/2010 | Elflein | |
| 7,905,306 B2 | 3/2011 | Kramer et al. | |
| 8,020,829 B1 | 11/2011 | Tamayori | |
| 8,056,874 B2 | 11/2011 | Goodwin et al. | |

(Continued)

FOREIGN PATENT DOCUMENTS

| | | |
|---|---|---|
| EP | 1923618 A2 | 5/2008 |
| FR | 2947719 A1 | 1/2011 |

(Continued)

*Primary Examiner* — Minnah L Seoh
*Assistant Examiner* — Ryan Edward Hardy

(57) ABSTRACT

A mount apparatus for a wheelchair is disclosed which is capable of transformation between an original form and a modified form. In the original form, a bearing member is released or otherwise disposed so that the mount apparatus exhibits substantially minimal projection in the direction of the outer lateral extents of the wheelchair. In the modified form, the bearing member is maintained in a projected disposition to enable load-bearing by the mount apparatus.

20 Claims, 32 Drawing Sheets

(56) References Cited

U.S. PATENT DOCUMENTS

| | | | |
|---|---|---|---|
| 8,215,421 | B2 | 7/2012 | Schneider |
| 8,292,314 | B1 | 10/2012 | Schaal |
| 8,348,293 | B1 | 1/2013 | Lasher |
| 8,651,507 | B2 | 2/2014 | Kylstra |
| 9,050,230 | B2 | 6/2015 | Fast et al. |
| 9,265,676 | B2 | 2/2016 | Williams |
| 9,402,016 | B1 | 7/2016 | Hidalgo |
| 9,452,098 | B1 | 9/2016 | Howard |
| 9,510,983 | B2 | 12/2016 | Smith |
| 9,872,805 | B2 | 1/2018 | Bach Castillo |
| 10,155,414 | B2 | 12/2018 | Bleau et al. |
| 10,173,806 | B2 | 1/2019 | Reznikov |
| 10,245,204 | B2 | 4/2019 | Sandler et al. |
| 10,272,786 | B2 | 4/2019 | Schneider |
| 10,299,975 | B2 | 5/2019 | Sayed |
| 10,363,179 | B2 | 7/2019 | Itano |
| 10,555,847 | B2 | 2/2020 | Lane |
| 10,577,042 | B2 * | 3/2020 | Schoch .................. F16B 2/185 |
| 10,582,981 | B2 | 3/2020 | Childs et al. |
| 10,588,796 | B2 | 3/2020 | Bach Castillo |
| 10,695,242 | B2 | 6/2020 | Herrmann |
| 10,704,580 | B2 * | 7/2020 | Bordenave .............. A61G 5/10 |
| 10,786,407 | B2 | 9/2020 | Ellis |
| 10,792,201 | B2 | 10/2020 | Blankenship et al. |
| 10,821,041 | B2 | 11/2020 | Sayed |
| 10,849,802 | B2 | 12/2020 | Hirata |
| 10,869,976 | B2 | 12/2020 | Hoysan |
| 10,874,563 | B2 | 12/2020 | Golden, Jr. |
| 10,932,965 | B2 | 3/2021 | Moore |
| 2009/0032657 | A1 | 2/2009 | Huang |
| 2013/0009372 | A1 | 1/2013 | Willis |
| 2015/0001359 | A1 * | 1/2015 | Catchings ............. F16M 11/14 248/220.22 |
| 2015/0001833 | A1 * | 1/2015 | Golden, Jr. ............. A61G 5/10 280/727 |
| 2016/0101005 | A1 * | 4/2016 | Golden, Jr. ............ B62B 19/04 29/401.1 |
| 2016/0151215 | A1 * | 6/2016 | Golden, Jr. ........... A61G 5/104 280/304.1 |
| 2016/0199983 | A1 | 7/2016 | Hyde et al. |
| 2017/0172822 | A1 * | 6/2017 | Golden, Jr. ........... A61G 5/027 |
| 2018/0325757 | A1 | 11/2018 | Schmid |
| 2019/0046374 | A1 * | 2/2019 | Golden, Jr. .......... A61G 5/1083 |
| 2019/0350394 | A1 * | 11/2019 | Jones ................ A47G 23/0216 |
| 2020/0069488 | A1 * | 3/2020 | Malings .............. A61G 5/1043 |
| 2020/0079153 | A1 * | 3/2020 | Zeltner .............. B60B 33/0071 |
| 2021/0013404 | A1 | 4/2021 | Caddell |

FOREIGN PATENT DOCUMENTS

| | | | |
|---|---|---|---|
| GB | 2399592 | A | 5/2006 |
| GB | 2425149 | B | 5/2009 |
| WO | WO/2010/094930 | A1 | 8/2010 |
| WO | WO/2015/048743 | A2 | 4/2015 |
| WO | WO/2017/158504 | A1 | 9/2017 |
| WO | WO/2020/021562 | A1 | 1/2020 |
| WO | WO-2021118387 | A1 * | 6/2021 |

* cited by examiner

WHEELCHAIR MOUNT APPARATUS

CROSS-REFERENCE TO RELATED APPLICATION

This application claims priority to, and is a continuation of, U.S. Provisional Patent Appl. Ser. No. 62/977,885, "An Accessory Device Attachment System for a Wheelchair," filed Feb. 18, 2020, which is hereby incorporated by reference in its entirety for all purposes.

BACKGROUND OF THE INVENTION

1. Field of the Invention

This invention relates to adaptations achieved with wheelchairs for personal mobility and for performing activities of daily living.

2. Description of Related Art

Wheelchairs have evolved substantially over the last several decades, incorporating strong and lightweight structural materials such as aluminum, titanium, and carbon fiber, as well as improved ergonomics and application of computer-aided design and engineering tools to create and manufacture highly-customized frame designs. Additionally, specialized components for modern wheelchairs have become increasingly popular and universal, including all-terrain attachments, motorized attachments, device holders and other add-on implements.

For the individual wheelchair user, a consequence of daily use is an acknowledgement of the wheelchair as an extension of the physical self, essential to the user for freedom and enjoyment, and as a convenient tool for performing activities of daily living (ADLs). It is often the case that, in time, a wheelchair user will learn various useful ways of improving or otherwise reconfiguring the wheelchair, whether under the direction of clinicians, through observation of peers, or through personal experimentation. Therefore, it is desirable and commercially viable to avail wheelchair users of opportunities to augment the functionalities of their wheelchairs by customizing and accessorizing with a variety of lightweight, minimalistic, and aesthetically-appealing attachable implements.

Optimizing wheelchairs for the purposes of mobility and for performing activities of daily living continues to present challenges, particularly regarding connectivity of implements. Various mounting approaches have been taught in the prior art but do not adequately address convenience, safety, and versatility factors associated with implement connectivity experienced by wheelchair users.

Universal wheelchair attachment apparatuses, systems, and methods have been devised. Embodiments hereafter described, while typically addressing one or more weaknesses in the prior art need not directly or indirectly address all or any weaknesses in the prior art mentioned herein to be within the scope of the various embodiments hereafter claimed. Further, any advantages stated or apparently inherent to any of the embodiments described hereafter are not intended as limitations that must necessarily be found in any or all aspects of the invention.

SUMMARY OF THE INVENTION

The present invention is directed at solving the general problem of limited versatility of modern wheelchairs, and aims to solve this problem by equipping at least one of the left and right front lateral portions of the wheelchair with a mount apparatus to enable attachment of at least one of a plurality of implements in a desired orientation, especially in a manner that enables operation of an implement by an occupant of the wheelchair or by an assistant thereof, while the occupant of the wheelchair is able to remain in a comfortable, substantially upright seated position.

Implements adapted for use with a wheelchair equipped with a mount apparatus according to the present invention include those for ground-contacting applications and those for elevated, non-ground-contacting applications. Useful ground-contacting type implements and non-ground-contacting type implements are exemplified in U.S. Pat. No. 10,874,563 B2, "Wheelchair Implement System," the disclosure of which is incorporated herein by reference in its entirety to the extent that it is noncontradictory herewith.

Useful implements, adapted for connection to the mount apparatus, may be subject to considerations such as lifestyle, safety, features and limitations of the host wheelchair, modularity, and mass-customizability and may include but are not limited to: a horn, siren, or other audible alert device; a holster for a self-defense device, such as a handgun, blade, or deterrent spray; a leg positioner, cushion, or pad; a "conversation piece" device, such as a beverage bottle opener; a musical instrument holder or positioner; a pediatric accessory holder, to hold and position a toy, stuffed animal, or other item of comfort and enjoyment to be placed in proximity to a pediatric wheelchair user; a bendable, twistable, or otherwise flexible gripper device capable of conforming to a variety of shapes, especially to hold solid objects; aesthetic accessories, such as colored party lights, decorations, or wheelchair "jewelry" intended to add visual interest; accessories common in the bicycle industry, such as a water bottle holder or an illumination device; a tie-down linkage device specifically for safe and secure transportation inside an automobile or locomotive; a magnetic attachment device comprising a surface or element capable of holding a ferrometallic object; magnetically-attachable accessories; a medical device holder, capable of securely holding an intravenous (IV) assembly, an oxygen tank, or other medical instruments or supplies; an electronic device holder capable of securely holding and positioning a portable electronics device such as a phone, tablet, music player, or computer; a camera holder capable of securely holding and positioning a device capable of capturing photographs or video content; a measurement device capable of indicating or recording speed, acceleration, distance, or orientation of the wheelchair, such as a speedometer, a distance counter, or a bubble level; an Illumination device, such as a reflector, a flashlight, or a blinking LED light; a belt-clip adapter module for connecting a device that has been integrated with a metal or plastic belt clip; other "interposed" adapter modules, comprising friction-grip, magnetic, latching, gravity-engaging or quick-releasable (cam and lever) retention means; a flexible arm, such as a metal "snake" or a segmented "modular hose" capable of being bent, twisted or otherwise repositioned to place another device in a desired position or orientation relative to the user; a cargo bag, a purse, a multipurpose object carrier, or a personal-effects bag; a luggage carrier or a symmetrically-opposing pair thereof, such as a pair of forward-oriented arms or rods capable of supporting a briefcase or a travel bag; an umbrella holder; a tray for supporting medical supplies for use while in a public or private bathroom; a work surface device for supporting books, paperwork, portable electronics, a handheld mouse, or a keyboard; a removable load-bearing pin or post, especially for enabling deployment of a load-bearing attachable device; auxiliary wheel apparatuses, such as symmetrically-opposing (left-sided and right-sided) caster wheels; vibration-dampening auxiliary wheel assemblies, such as pivotable caster wheel assemblies comprising gas, hydraulic, spring, or elastomeric shocks or suspension components; angle-adjustable all-terrain caster wheels (which may comprise a bolt-tensionable clamp, a serrated plate, grip washer, or other angle adjustment feature capable of being loosened and tightened for adjustment purposes, and which may include a bubble level indicator to facilitate adjustment with respect to "pitch" and "roll" orientations of each caster wheel); dual separate motorized wheels; a singular, centrally-disposed motorized wheel apparatus; skis for traversal over snow or ice; and two or more of the aforementioned devices capable of operating synergistically while secured relative to the wheelchair.

Wheelchair adaptations as manifested in embodiments of the present invention include those comprising a mount apparatus that has been permanently integrated with a frame portion of the wheelchair by welding, cementing, or the like, and those in which a mount apparatus has been semi-permanently secured to the wheelchair such as with a bolt, screw, threaded hole, aperture, pin, clamp, strap, or other such fastening means.

Central to the present invention is my discovery that, for optimized versatility, a wheelchair can be advantageously built, retrofitted or otherwise adapted with a mount apparatus, disposed at a forward lateral location of the wheelchair, that is capable of a plurality of connection configurations in which:

I. the mount apparatus is easy for a seated occupant of the wheelchair to access and manipulate in order to transition between connection configurations;

II. the mount apparatus is capable of load-bearing in order to transfer weight from the frame of the wheelchair to a ground-contacting implement or, conversely, from an elevated-type implement to the frame of the wheelchair; and III. the mount apparatus is capable of assuming a form which exhibits a minimal degree of outward projection in the direction of the outer lateral extents of the wheelchair.

In accordance with the invention, then, embodiments of the wheelchair mount apparatus are disclosed which are capable of transformation between an original, vacated form and a modified form wherein, in the original form, a bearing member is released or otherwise displaced so that the mount apparatus exhibits substantially minimal projection in the direction of the outer lateral extents of the wheelchair and wherein, in the modified form, the bearing member is substantially secured and maintained in a projected disposition to enable load-bearing by the mount apparatus.

Embodiments of the wheelchair mount apparatus may enable connection of an implement in a substantially lateral direction and retention of the implement in a predetermined position with respect to the substantially lateral direction. In embodiments, the wheelchair mount apparatus may additionally enable connection of an implement in a substantially vertical, diagonal, or longitudinal direction, with the objective of achieving and securely maintaining a predetermined position of the implement relative to the wheelchair.

Embodiments of the wheelchair mount apparatus provide increased versatility by virtue of enabling multiple modes of operation. For example, in a first mode of operation, the outer lateral surface is left in the original, vacated form, with the mount apparatus being capable of direct connection of certain implements such as a magnetically-attaching illumination device, a tray device, an attachment for holding portable electronic devices, or a downwardly-rotating luggage carrier arm. In the first mode of operation, the outer lateral surface is also capable of connection of an intermediary member comprising an adapting member to subsequently achieve a second mode of operation which enables connection, support, and retention of an indirectly-connectable implement.

In an embodiment exemplifying the second mode of operation, the mount apparatus is transformed to a modified form to be prepared, as a result of connection of an intermediary member, to enable connection, support, and retention of an indirectly-connectable implement which is rotationally-fixed, that is, non-rotatable. The intermediary member may comprise, for example, a belt clip adapter dimensioned and shaped to enable the user to quickly attach and detach a pouch or cargo bag having a metal or plastic clip of the type that is commonly used for connection to a waistbelt. In another embodiment, the intermediary member may comprise a tubular support member for holding an implement such as an umbrella, a flag pole, or a fishing rod.

In another embodiment exemplifying the second mode of operation, the mount apparatus is transformed to a modified form to be prepared, as a result of connection of a load-bearing intermediary member adapted to enable rotary deployment of a rotationally-deployable implement such as an all-terrain wheel attachment wherein, subsequent to connecting the implement, rotation of the implement toward a deployed orientation results in rotational engagement of an engageable member of the implement with the load-bearing intermediary member. A load-bearing intermediary member adapted specifically to enable rotary-engaging deployment may, for example, comprise a cylindrical bearing capable of load-bearing or that is otherwise capable of transferring force from the implement to the mount apparatus, or vice-versa.

In embodiments, it may be especially useful for the intermediary member to comprise magnetic means, such as a ferrite, ceramic, or neodymium magnet, or a metallic member capable of magnetic attraction, to enable releasable connection and retention of the intermediary member relative to the mount apparatus or within a recess or aperture thereof.

In embodiments, other elements may be useful for the purpose of enabling releasable connection and retention of the intermediary member in a predetermined position relative to the outer lateral surface of the mount apparatus or within a recess or aperture thereof. Other means of releasably securing the intermediary member in a predetermined position relative to the outer lateral surface of the mount apparatus may include: a cam or lever-actuated clamp or jaw mechanism, a ball-detent pin, a threaded element, a retractable pin or stud, or a stud, pin, or other projecting element capable of inward and outward rotation, folding, or displacement otherwise or other such elements which facilitate rapid and repeatable repositioning or removal of the intermediary member relative to the mount apparatus. With the means just described, the overarching objective is to enable a return of the outer lateral surface of the mount apparatus back to its substantially vacant, uniform condition.

The invention thus provides the user with versatile implement attachment capabilities, when so desired, while also providing capacity for a minimalistic, streamlined outer mount structure that does not impose risk of personal injury nor damage to personal effects, household items or other property, nor generate similar issues otherwise associated with having undesirable obtrusive elements projecting beyond the outer extents of the wheelchair.

DETAILED DESCRIPTION OF THE INVENTION

The drawings described hereinafter are intended for the purpose of illustration rather than limitation.

To facilitate understanding of the figures, when appropriate, a structural element adapted to be located on the right side of the wheelchair, from the perspective of an occupant of the wheelchair, has been labeled with the suffix "R" following the numeral corresponding to the structural element. Similarly, when appropriate, a structural element adapted to be located on the left side of the wheelchair has been labeled with the suffix "L" following the numeral corresponding to the structural element. In cases where the aforementioned labeling convention does not aid in understanding of a particular figure, the suffix has been omitted and only the numeral has been used. For example, the left-side rear drive wheel is referred to by label "108L," and the right-side rear drive wheel is referred to by label "108R." However, in a side-view illustration wherein 108L cannot be visibly distinguished from 108R, the rear drive wheels are collectively referred to by using label "108." Similarly, in some illustrations, the figure may be sufficiently clear and easily understood without the need to distinguish between left-sided elements and right-sided elements; in such cases the "L" and "R" naming convention is not utilized.

Wheelchair 100, shown in FIG. 1A-D resting upon ground surface 50, comprises seat 104, backrest 106, rear drive wheels 108L and 108R, front caster wheels 110L and 110R, and footrest 112. Wheelchair 100 also comprises symmetrically-opposing (left and right) forward frame tube portions 102L and 102R onto which left and right mount apparatuses 120L and 120R are affixed.

Figure 1A:
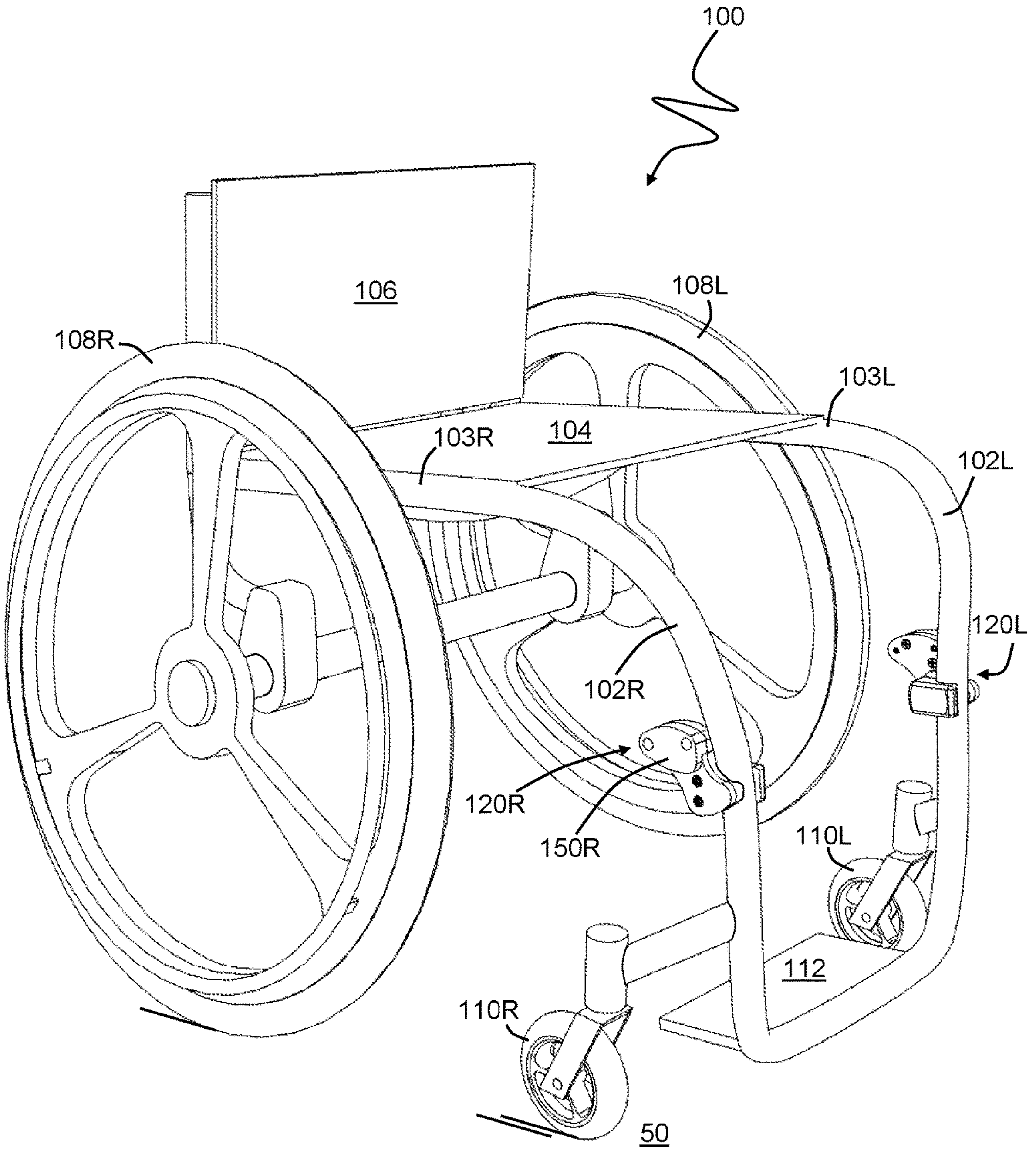
FIGS. 1A-D show views of a manual wheelchair outfitted with a mount apparatus.
Figure 1B:
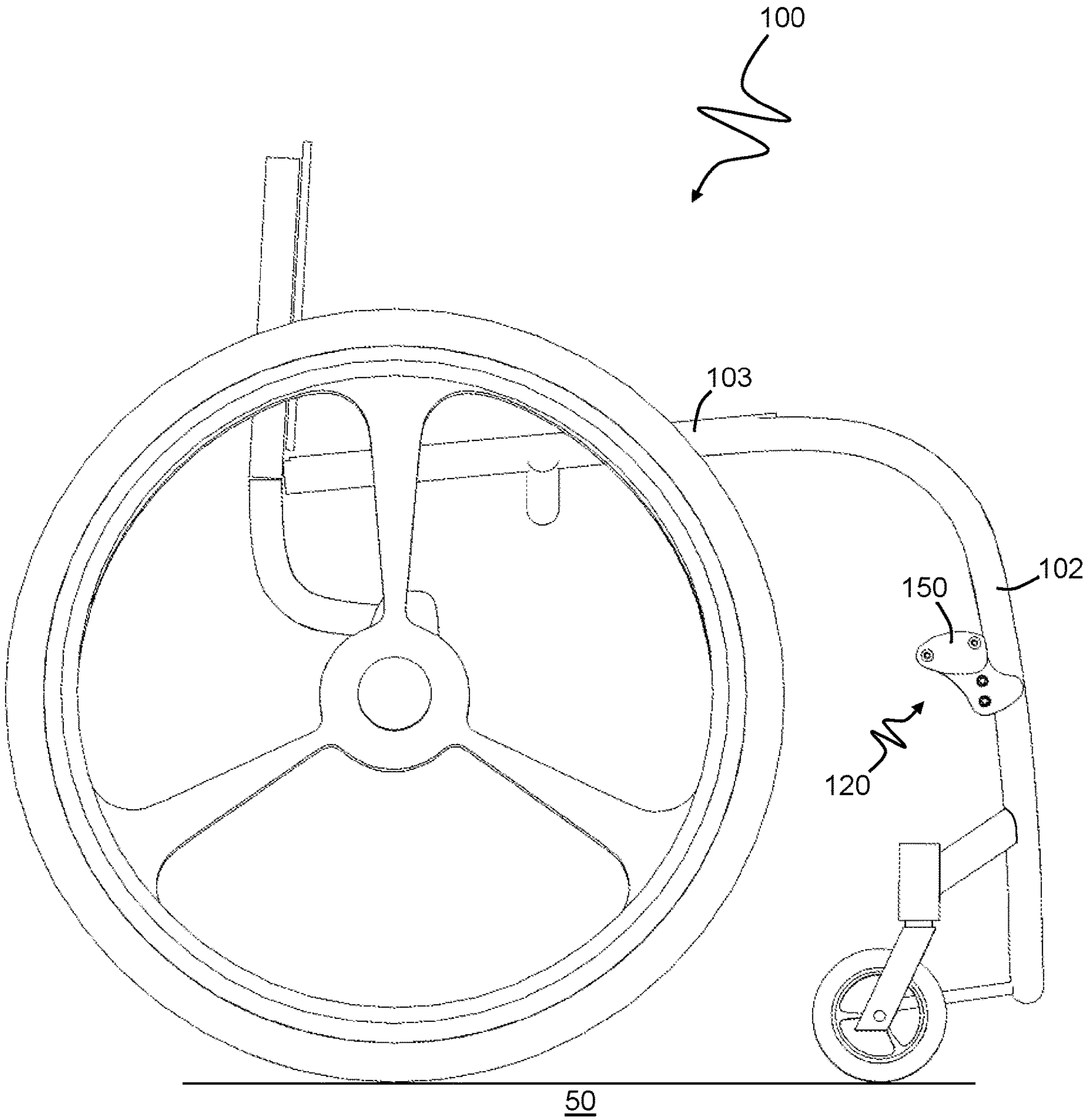
Figure 1C:
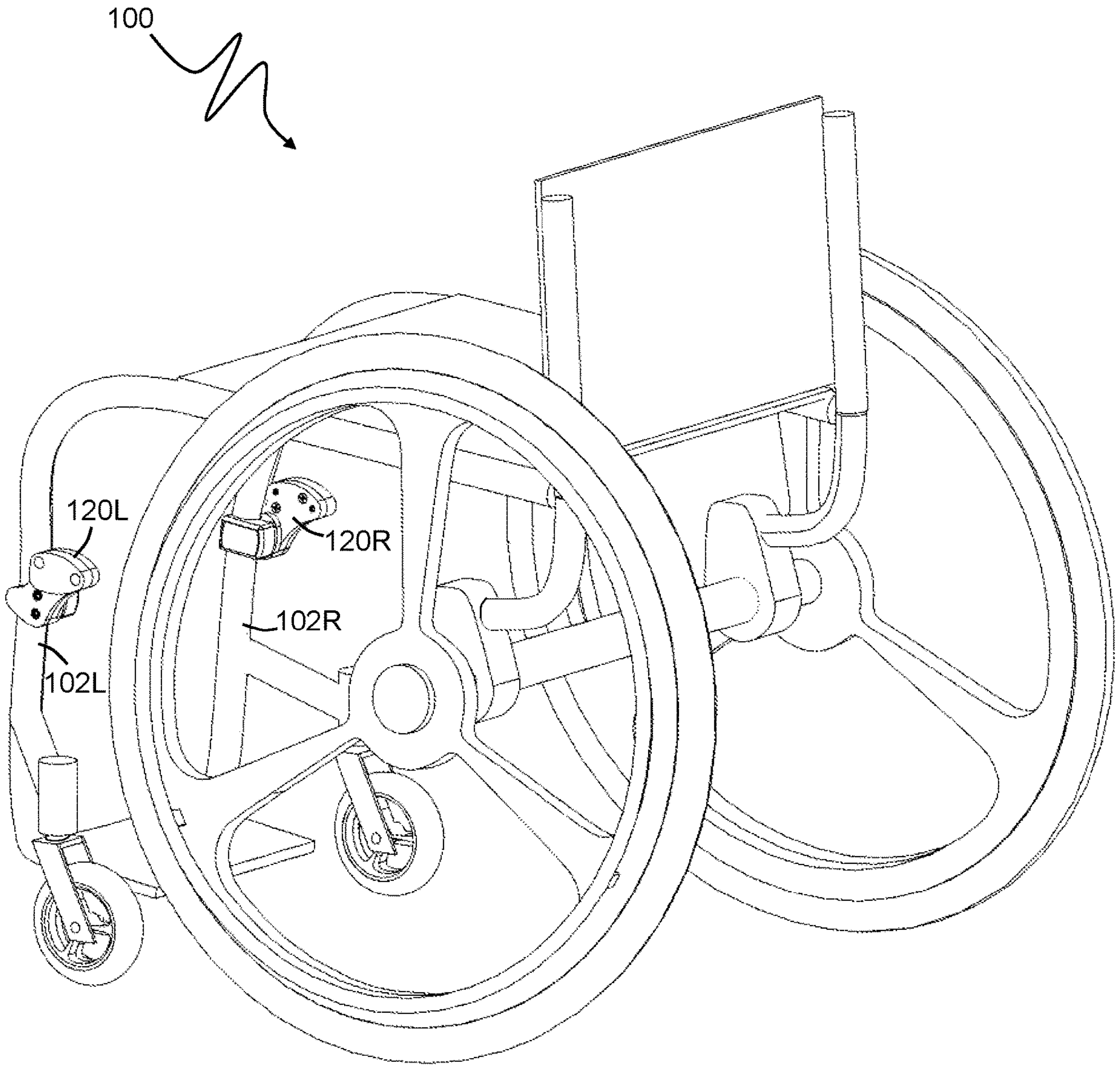
Figure 1D:
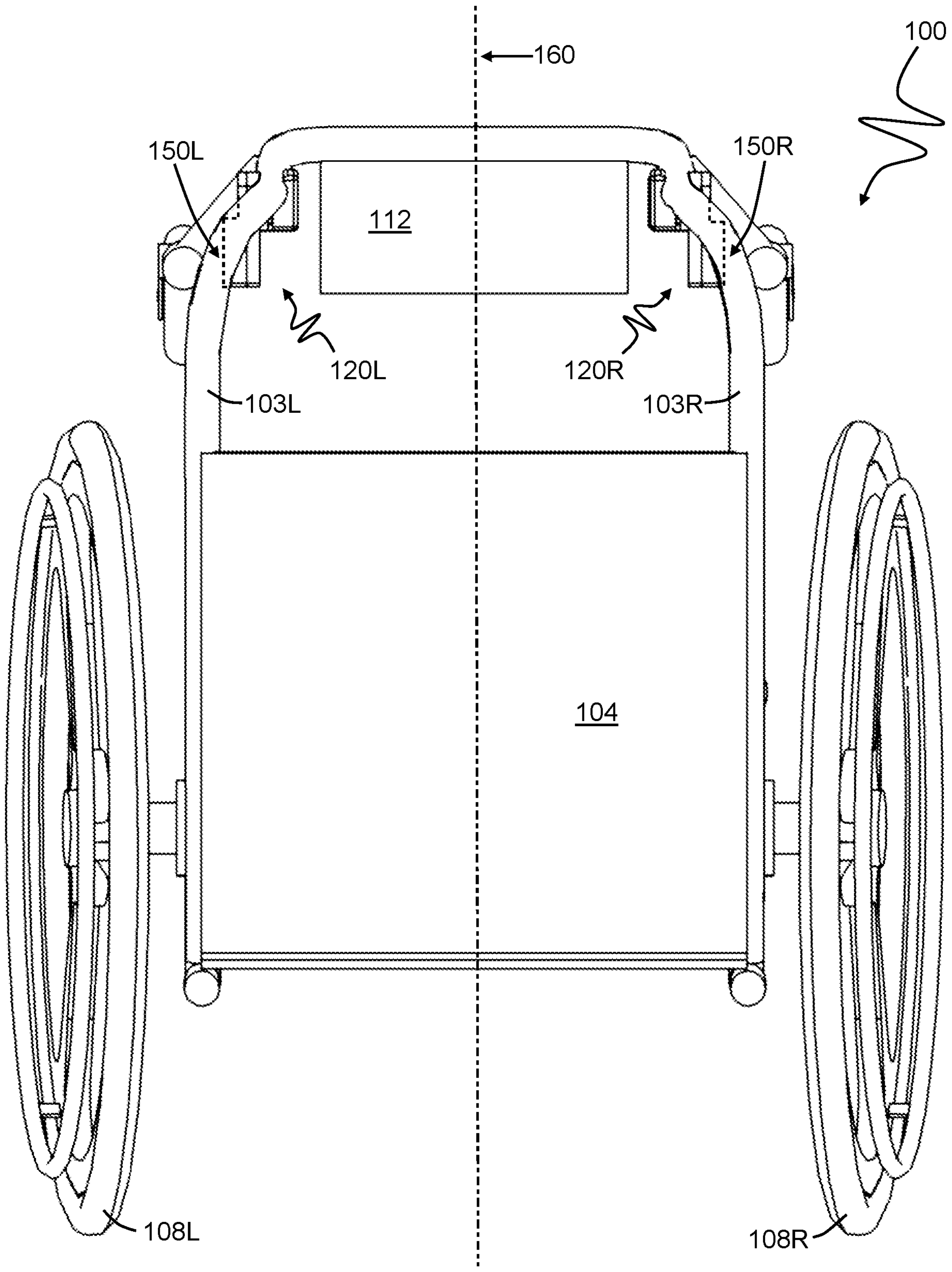

Left and right mount apparatuses 120L and 120R are both oriented to have outer lateral surfaces 150L and 150R substantially parallel with symmetrically-opposing upper lateral frame tube portions 103L and 103R. Wheelchair 100 is configured with seat 104 being rectangular, thus symmetrically-opposing upper lateral frame tube portions 103L and 103R are substantially parallel to each other as well as to imaginary central vertical plane 160 passing longitudinally through wheelchair 100, as shown in FIG. 1D.

Figure 2A:
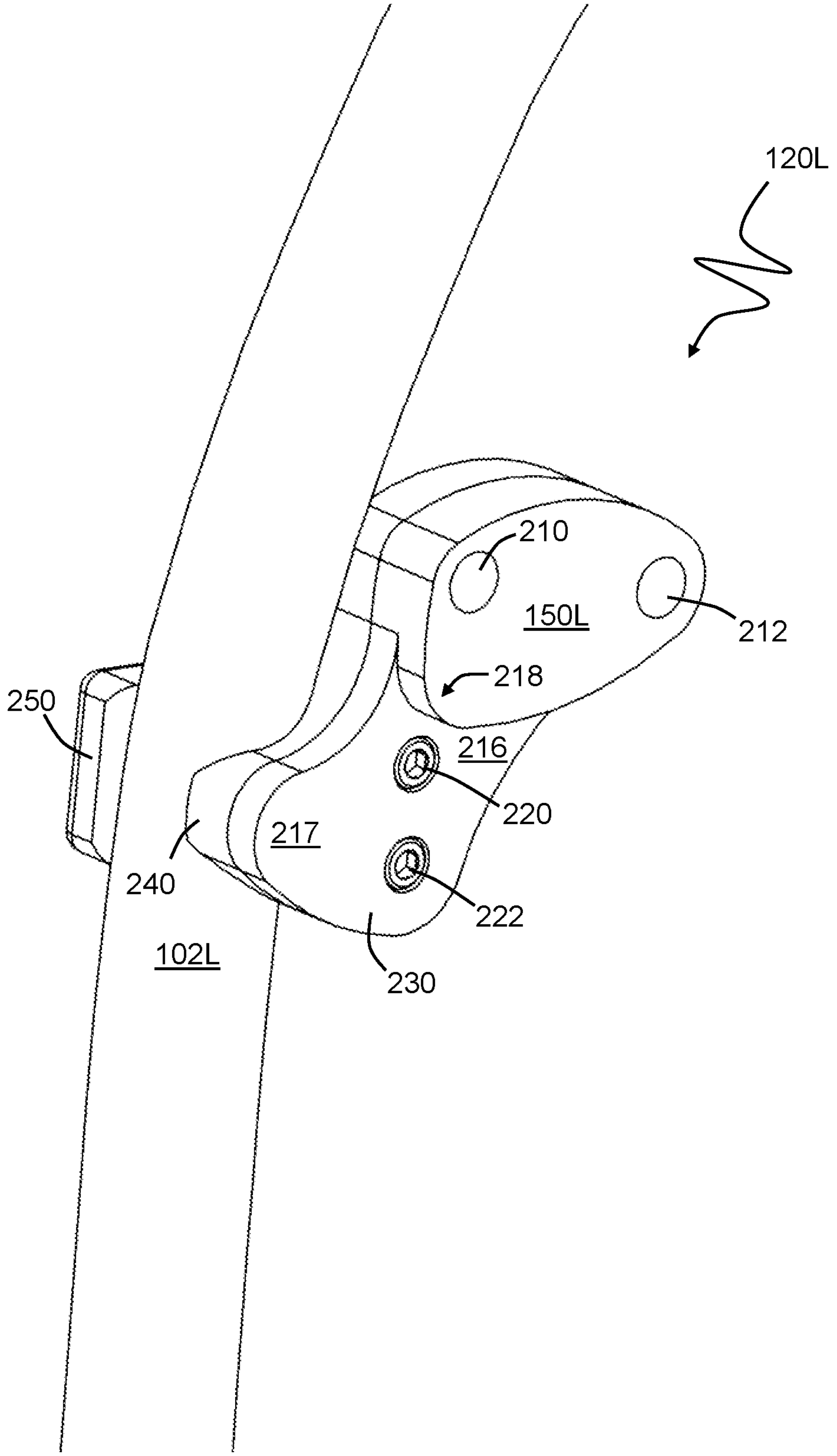
FIGS. 2A-C show close-up views of the mount apparatus.
Figure 2B:
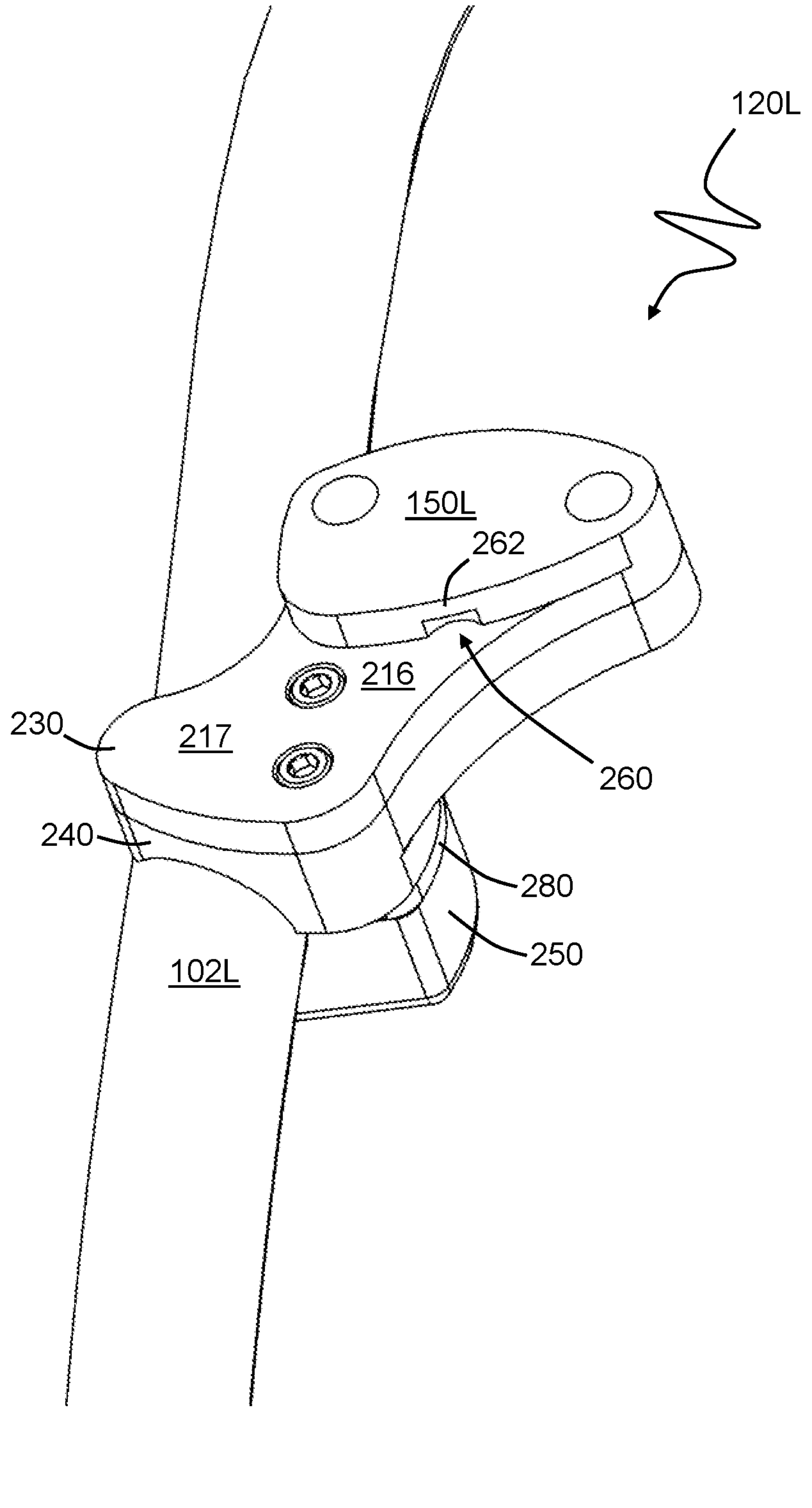
Figure 2C:
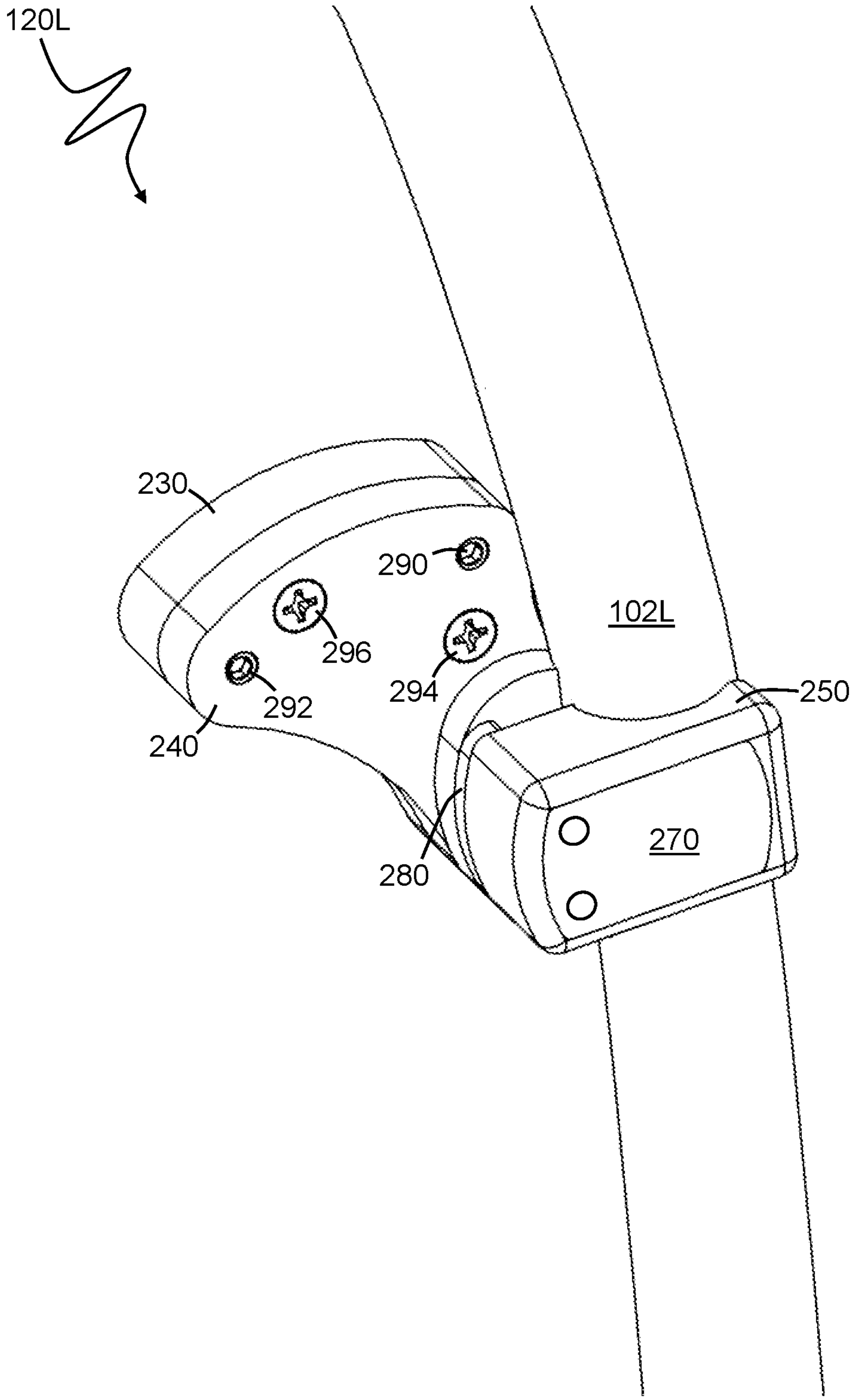

Close-up views of left mount apparatus 120L are shown in FIGS. 2A-C. Forward receiver hole 210 and rear receiver hole 212 are formed perpendicularly into outer lateral surface 150L of mount apparatus 120L. Outer lateral surface 150L is depicted as being substantially planar; however, embodiments may comprise an outer lateral surface having substantially rounded edges or an overall rounded appearance without obviating the fact that outer lateral surfaces 150L and 150R are oriented to be generally parallel to each other as well as to imaginary central vertical plane 160 and that forward receiver hole 210 and rear receiver hole 212 are generally perpendicular to outer lateral surface 150L.

Although mount apparatuses 120L and 120R are constructed to have outer lateral surfaces 150L and 150R oriented to be substantially parallel to each other, alternative installations may be possible in which outer lateral surfaces 150L and 150R deviate substantially from being parallel so that, for example, a symmetrically-opposing pair of implements attached to mount apparatuses 120L and 120R exhibit an outwardly-angled, splayed arrangement. Such a configuration may be advantageous in the case of a pair of all-terrain wheel implements wherein a wider effective wheelbase may offer improved stability and mobility of an adapted wheelchair over rough, irregular terrain. Such an alternative installation does not, however, depart from the spirit of the invention nor does its feasibility preclude the capacity for mount apparatuses 120L and 120R to be installed on wheelchair 100 in a substantially parallel fashion.

Neck 216 of left mount apparatus 120L adjoins outer lateral surface 150L to clamp portion 217, effectively disposing outer lateral surface 150L, forward receiver hole 210, and rear receiver hole 212 at a vertical position relative to wheelchair 100 that is substantially higher than the vertical position of clamp portion 217; this offset vertical positioning allows for a construction of left mount apparatus 120L that places upper clamp bolt 220 and lower clamp bolt 222 near to forward frame tube portion 102L while also placing forward receiver hole 210 in close proximity to forward frame tube portion 102L.

A compressive clamping effect is produced, as a result of clockwise rotation of upper clamp bolt 220 and lower clamp bolt 222, upon exterior outside clamp portion 230 (visible in FIGS. 2A-C) and exterior inside clamp portion 270 (visible in FIG. 2C), in turn compressing interior outside clamp portion 240 and interior inside clamp portion 250, to apply clamping force against opposing sides of forward frame tube portion 102L of wheelchair 100.

Beneath outer lateral surface 150L of mount apparatus 120L, retention lip 262 is formed as a result of the medial disposition of retention groove 260, which is dimensioned and contoured to enable engagement of a retention element of a rotatably-deploying attachable device such as, for example, an auxiliary wheel apparatus or a luggage carrier apparatus.

Visible in FIGS. 2B-C is compression tab 280 of interior inside clamp portion 250, which serves to concentrate compressive clamping force around forward frame tube portion 102L in a cantilevered fashion. Forward set screw 290 and rear set screw 292, visible in FIG. 2C, are ferritic and achieve magnetic contact with a magnetic bearing pin or other magnetic element upon insertion thereof into forward receiver hole 210 (visible in FIGS. 2A-B) and rear receiver hole 212 (visible in FIGS. 2A-B), respectively. Forward plate screw 294 and rear plate screw 296 secure exterior outside clamp portion 230 to interior outside clamp portion 240.

Figure 3A:
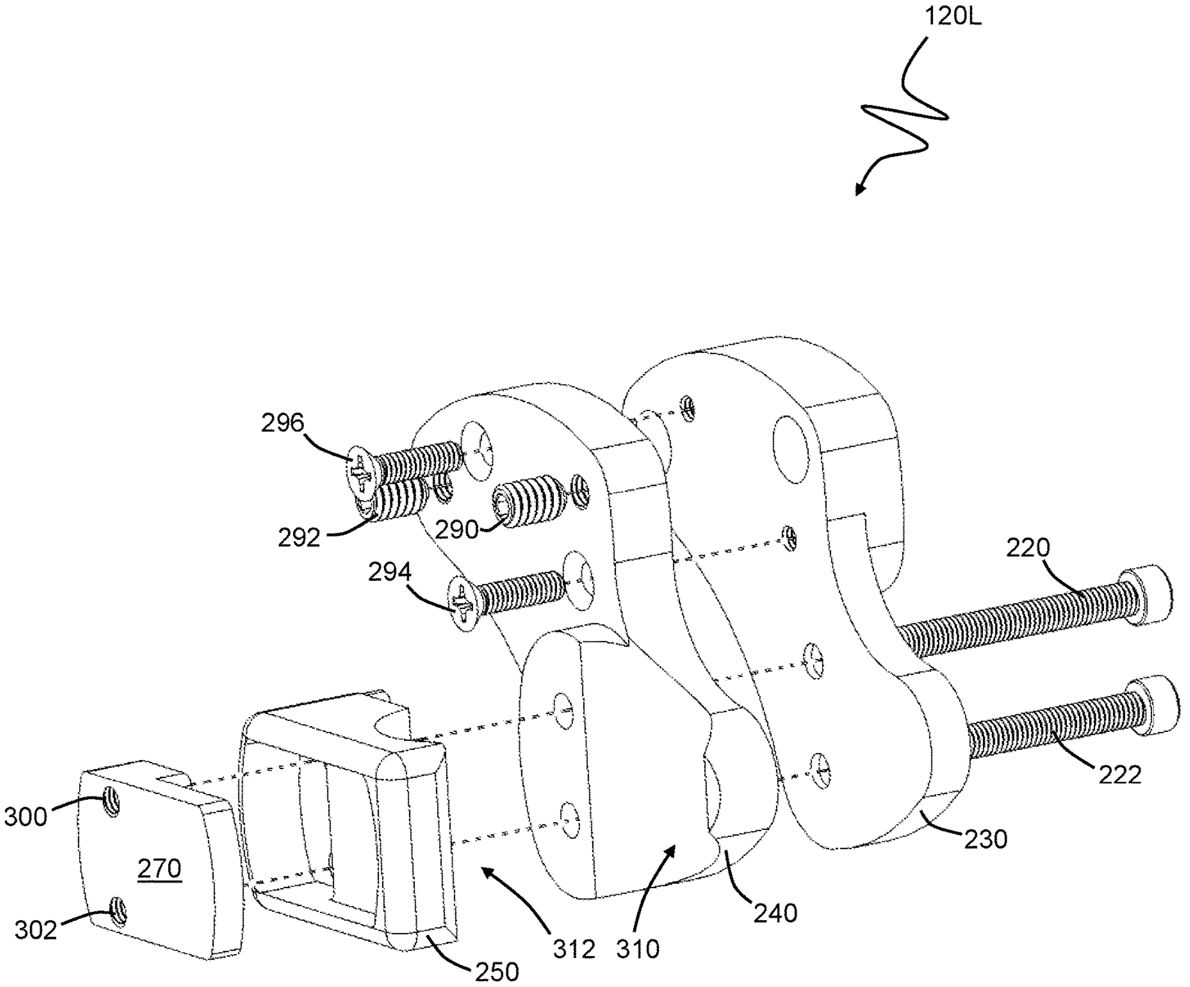
FIGS. 3A-B show exploded views of the mount apparatus.
Figure 3B:
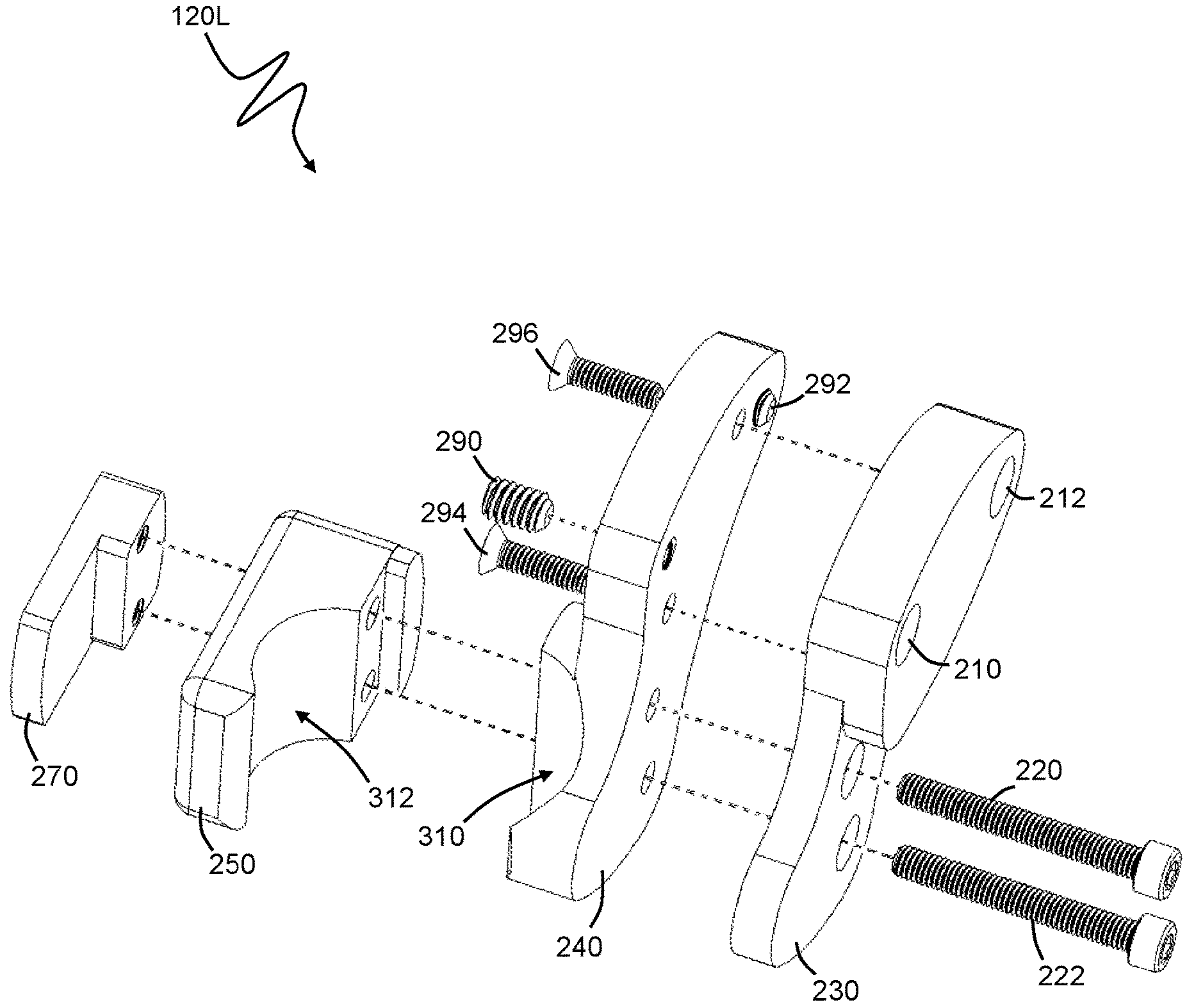

Exploded views are shown in FIGS. 3A-B of mount apparatus 120L, the construction of which permits design choice in the use of similar or dissimilar materials for the inside and outside clamp portions, such as aluminum, steel, plastic, carbon fiber, or composite materials. For example, whereas exterior outside clamp portion 230 may be fabricated by the machining of a low-grade alloy such as 6061 aluminum, it may be preferable for exterior inside clamp portion 270 be compose of a higher-grade alloy such as 7075 aluminum for its increased strength, stiffness, and capacity to maintain the integrity of its threaded bolt holes 300 and 302. Interior outside clamp portion 240 and interior inside clamp portion 250 may be composed of a similar or dissimilar material relative to that of the exterior clamp portions such as, for example, aluminum, steel, plastic, carbon fiber, or a composite blend such as nylon impregnated with carbon fiber.

Interior clamp portions 240 and 250 are especially well suited for fused deposition modeling and fused filament fabrication (3D printing) techniques because customization may be required to adapt the mount apparatus 120L in order to accommodate unique front frame angles and inward tapers of wheelchair 100. Outside tube contact surface 310 and inside tube contact surface 312, for example, may be modeled according to the angular specifications as well as frame tube diameter of a given wheelchair to ensure that outer lateral surface 150 of mount apparatus 120L is oriented substantially in alignment with a central vertical plane passing longitudinally through wheelchair 100.

Exterior clamp portions 230 and 270 may remain standard, that is, unchanged from one wheelchair setup to the next, which may be beneficial for the purpose of minimizing production costs while permitting customization of interior clamp portions 240 and 250. Furthermore, the overall construction of mount apparatus 120, as demonstrated in the figures, permits selection by the designer of similar or dissimilar materials for the fabrication of the inside and outside clamp portions according to factors such as strength, weight, aesthetics, and production costs.

An important set of goals in the design and fabrication of mount apparatus 120 described above is the attainment of a mount structure that is lightweight and durable, and also so that it is capable of bearing any expected weight placed thereupon. A weight of an object separate from the wheelchair itself may be placed upon and transferred through mount apparatus 120 in the case of an elevated type implement capable of supporting and maintaining a weighted object such as, for example, a portable electronic device, a tray, a writing surface, or an article of luggage, the weight being transferred through the mount apparatus 120 to forward frame tube portion 102 of wheelchair 100. Also, the weight of the wheelchair 100 itself may be placed upon and transferred through mount apparatus 120 in the case of having a ground-contacting type implement, such as a forward auxiliary wheel apparatus, connected to forward frame tube portion 102. Having at least one ground-contacting type implement attached to wheelchair 100, a forward portion of the weight of the wheelchair, as well as that of an occupant thereof, is transferred through mount apparatus 120 to the ground-contacting type implement as it rests upon ground surface 50.

Exemplifying the ground-contacting type implement concept is latching auxiliary wheel apparatus 400L, depicted in FIGS. 4A-E, which is capable of being connected to mount apparatus 120L and capable of engaging with removable magnetic load-bearing pin 402 as a result of downward rotation of latching auxiliary wheel apparatus 400L upon a user or occupant reclining wheelchair 100, particularly in a manner which elevates front caster wheels 110L and 110R.

Figure 4A:
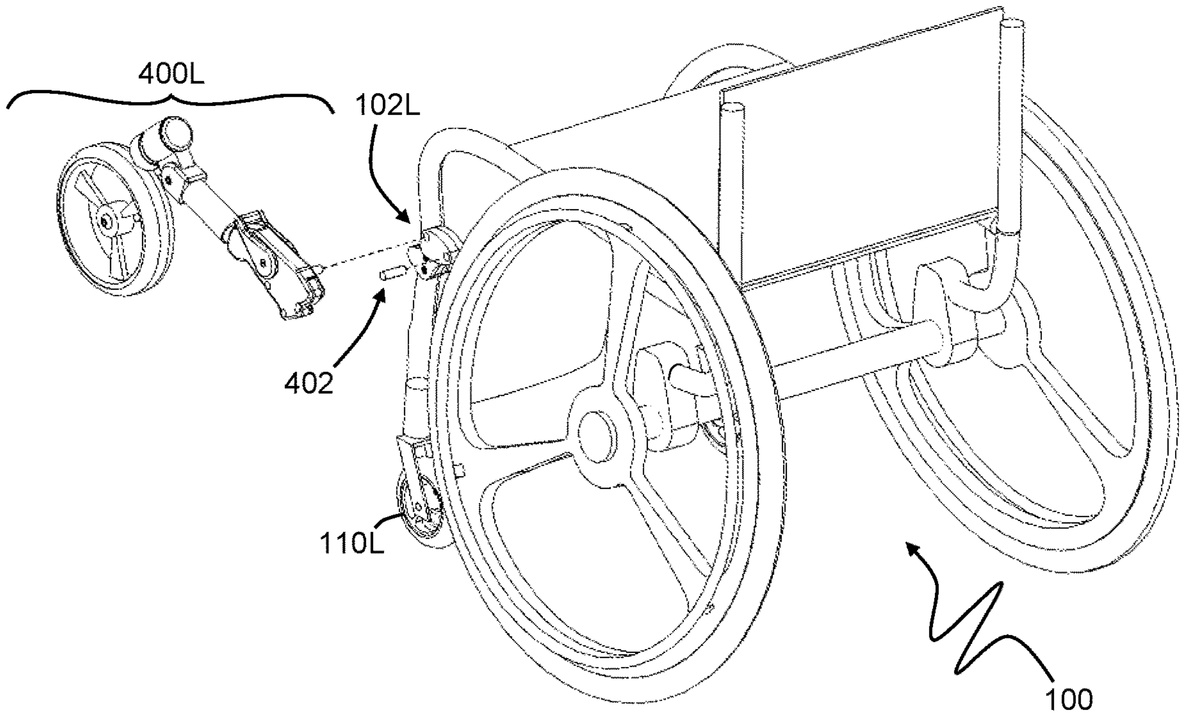
FIGS. 4A-G illustrate connection and deployment of a latching-type auxiliary wheel implement, the latching-type auxiliary wheel implement being capable of connection to the mount apparatus and engagement with a removable magnetic load-bearing pin.
Figure 4B:
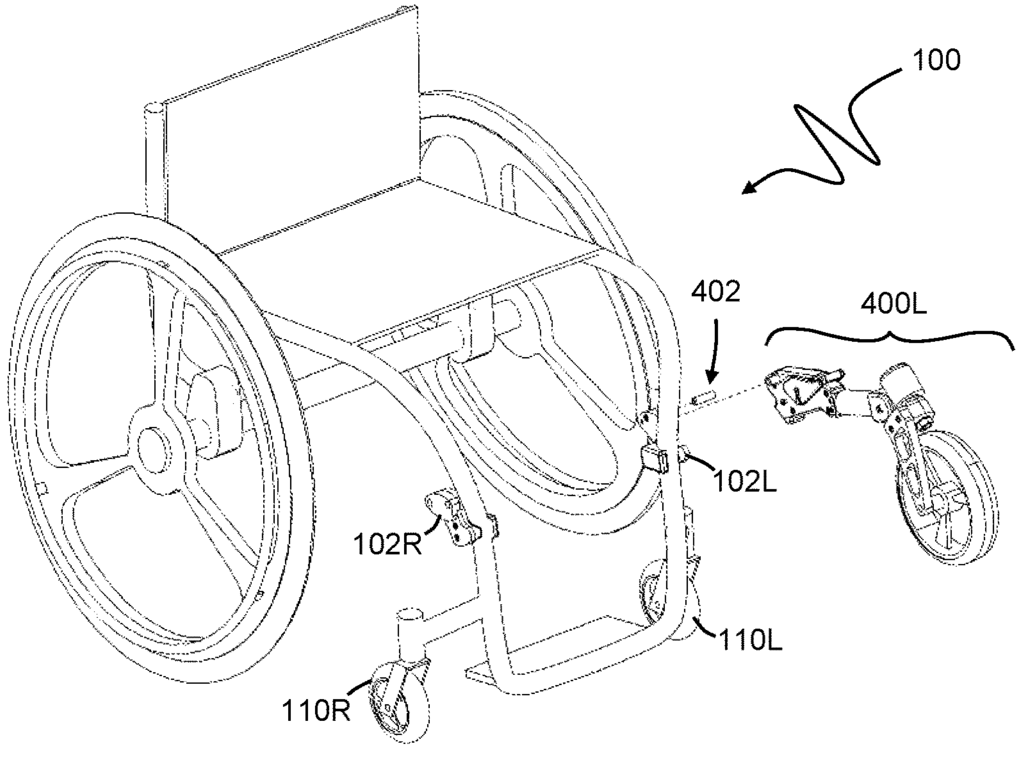
Figure 4C:
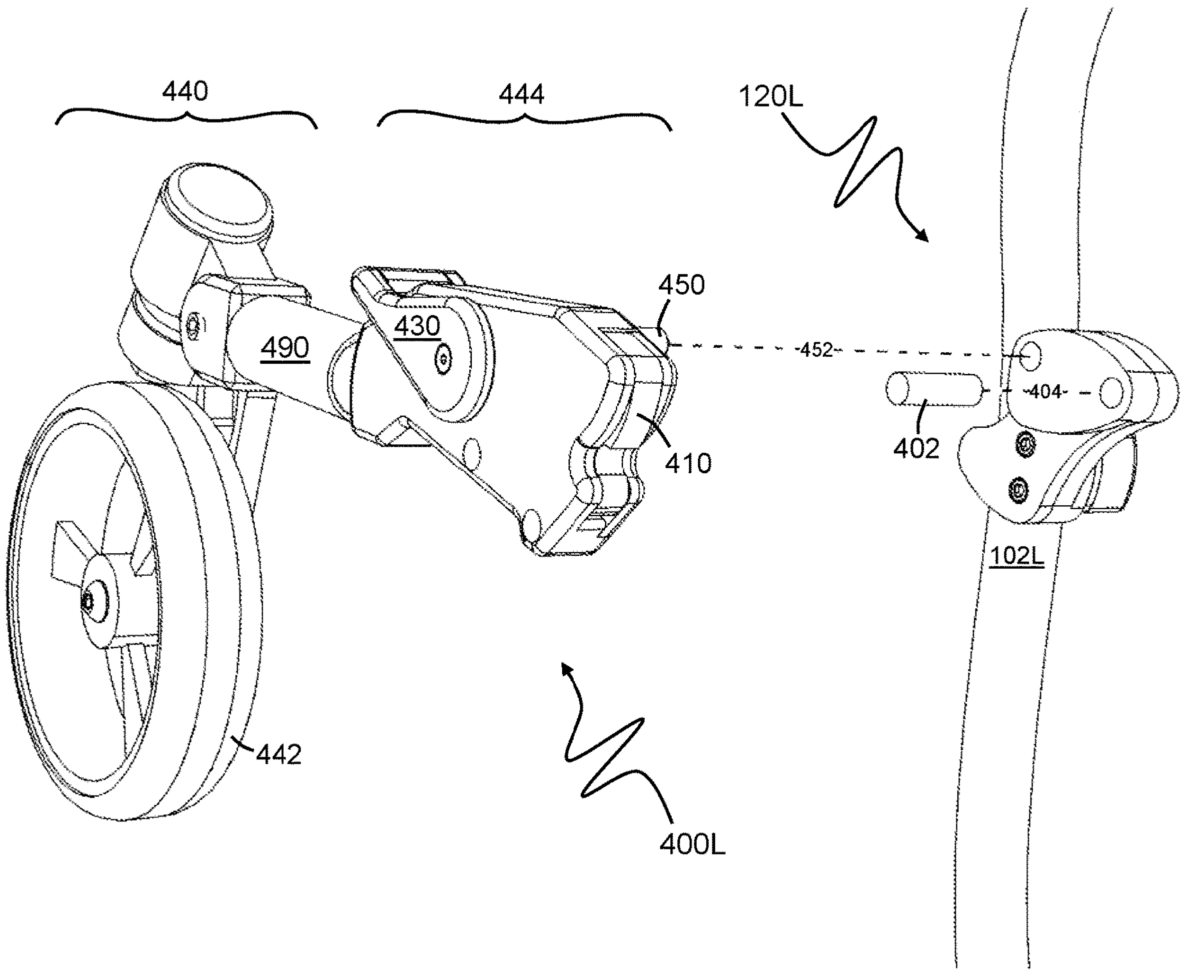

FIGS. 4A-C illustrate the connective relationships among latching auxiliary wheel apparatus 400L, removable magnetic load-bearing pin 402, and mount apparatus 120L, showing these components prior to connection and deployment relative to wheelchair 100. Removable magnetic load-bearing pin 402 is shown displaced from mount apparatus 120L and aligned with a rearward lateral line of insertion 404 (labeled in FIG. 4C) that projects through rear receiver hole 212 of mount apparatus 120L. Removable magnetic load-bearing pin 402 is adapted to fit securely and, upon insertion thereof, will remain in a predetermined inserted position within rear receiver hole 212 for the purpose of transferring force to mount apparatus 120L upon insertion and subsequent connection and deployment of latching auxiliary wheel apparatus 400L into forward receiver hole 210. Insertion pin 450 of latching auxiliary wheel apparatus 400L is shown aligned with a forward lateral line of insertion 452 (labeled in FIG. 4C) that projects through forward receiver hole 210. Latching auxiliary wheel apparatus 400L comprises pivotable caster wheel assembly 440 having wheel 442 and body portion 444. Pivotable caster wheel assembly 440 is connected to arm tube 490 which is connected to body portion 444. Latching auxiliary wheel apparatus 400L also comprises switch lever 430 which is rotatable, by a user, to bias latch element 410, through control of a load transitioning mechanism contained within body portion 444, to move toward a position of engagement with removable magnetic load-bearing pin 402.

Upon connection of latching auxiliary wheel apparatus 400L and removable magnetic load-bearing pin 402 to mount apparatus 120L, latch element 410 is capable of achieving load-bearing engagement with removable magnetic load-bearing pin 402 as a result of downward rotation of latching auxillary wheel apparatus 400L. Such downward rotation is effectuated by the user controllably reclining wheelchair 100 in a manner which elevates front caster wheels 110L and 110R of wheelchair 100 from contact with ground surface 50. Latching auxiliary wheel apparatus 400L is configured to enable the user to bias latch element 410, through control of the load transitioning mechanism contained within body portion 444, to move away from the position of engagement with removable magnetic load-bearing pin 402, thereby allowing the user to release latching auxiliary wheel apparatus 400L from deployment and to allow front caster wheels 110L and 110R to be lowered back down into contact with ground surface 50.

Figure 4D:
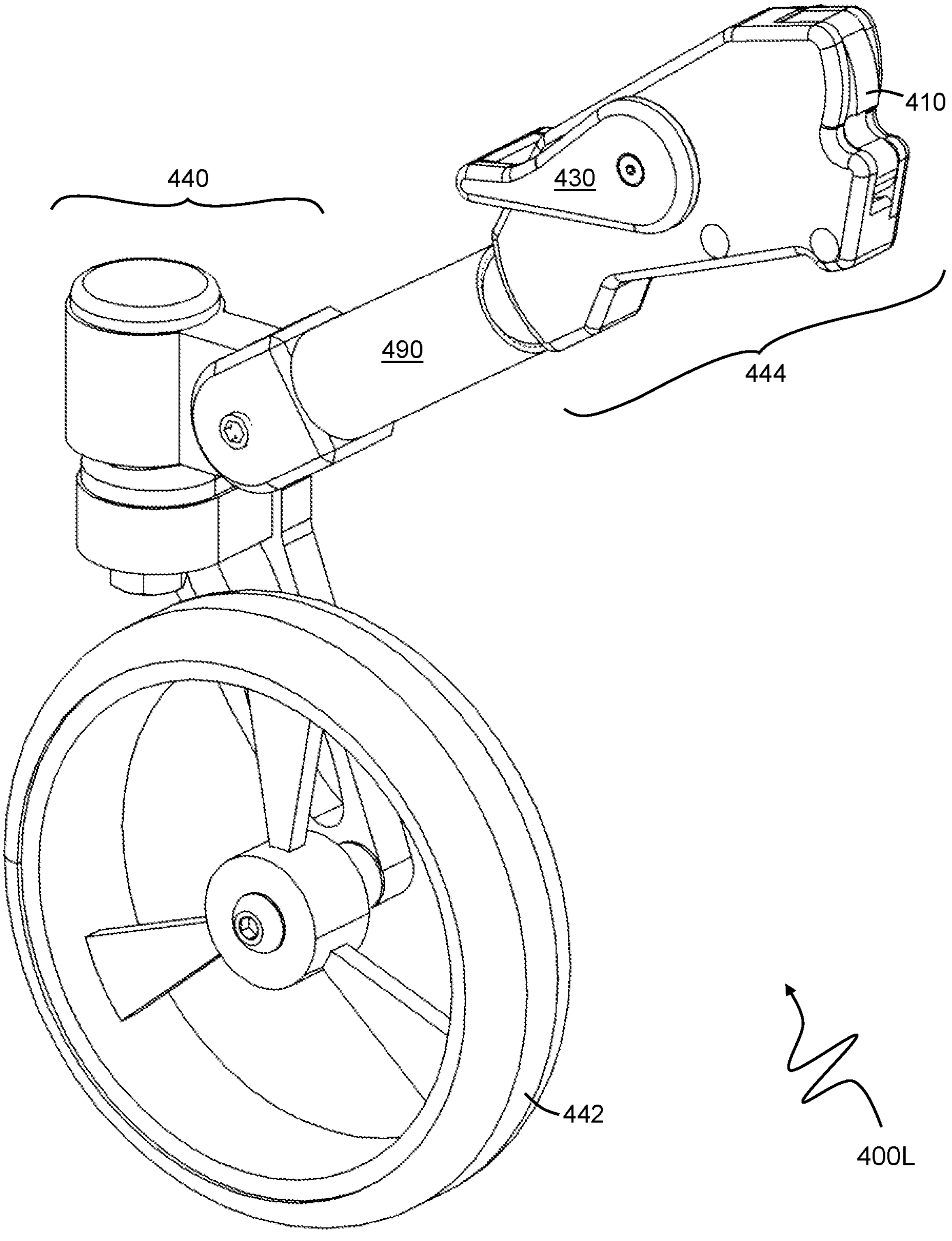
Figure 4E:
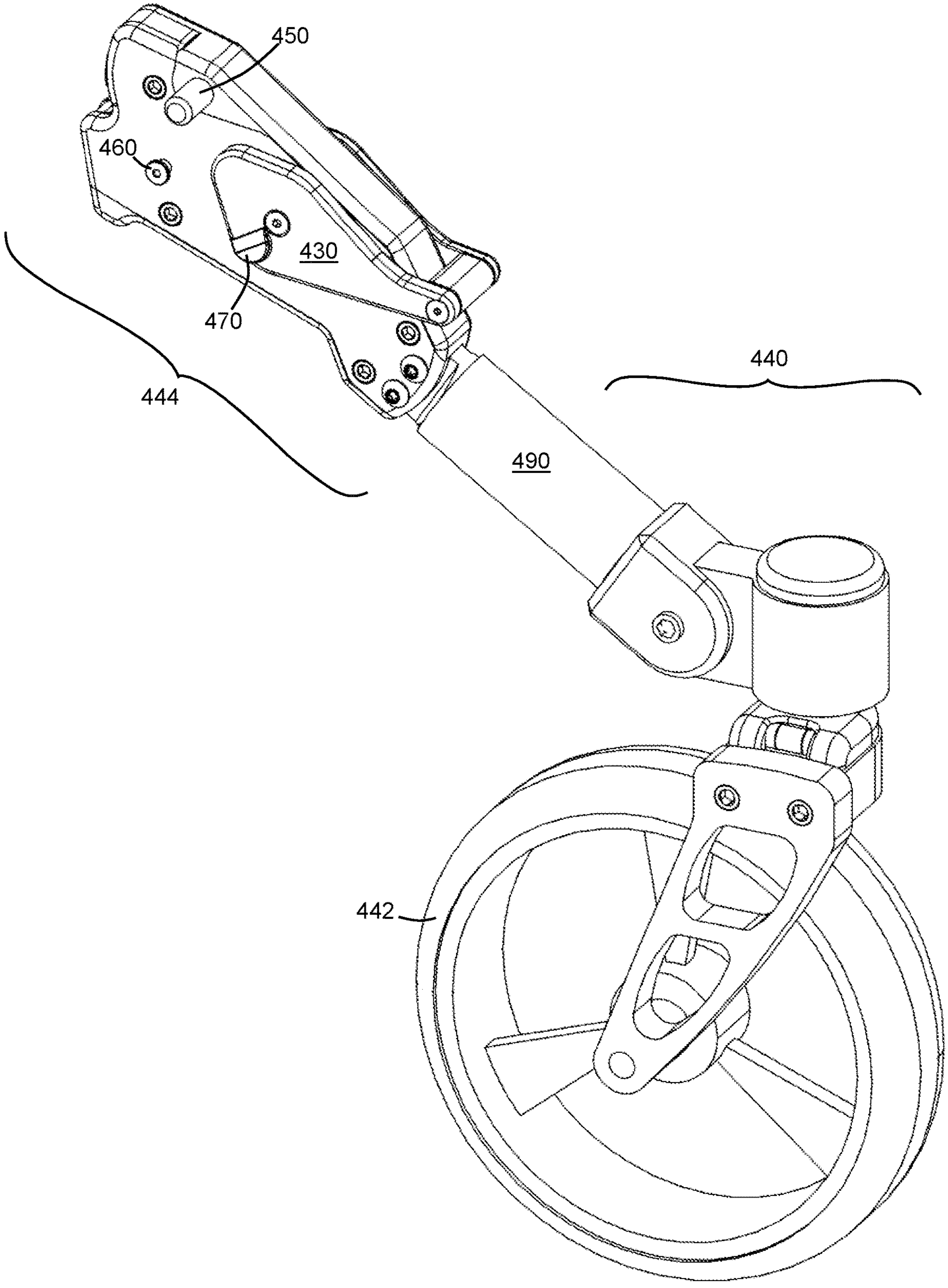

FIGS. 4D-E show wheelchair 100 having mount apparatuses 120L and 120R, connected to left and right forward frame tube portions 102L and 102R and outfitted with symmetrically-opposing latching auxiliary wheel apparatuses 400L and 400R, both having been deployed in the manner described in the preceding paragraph.

Figure 4F:
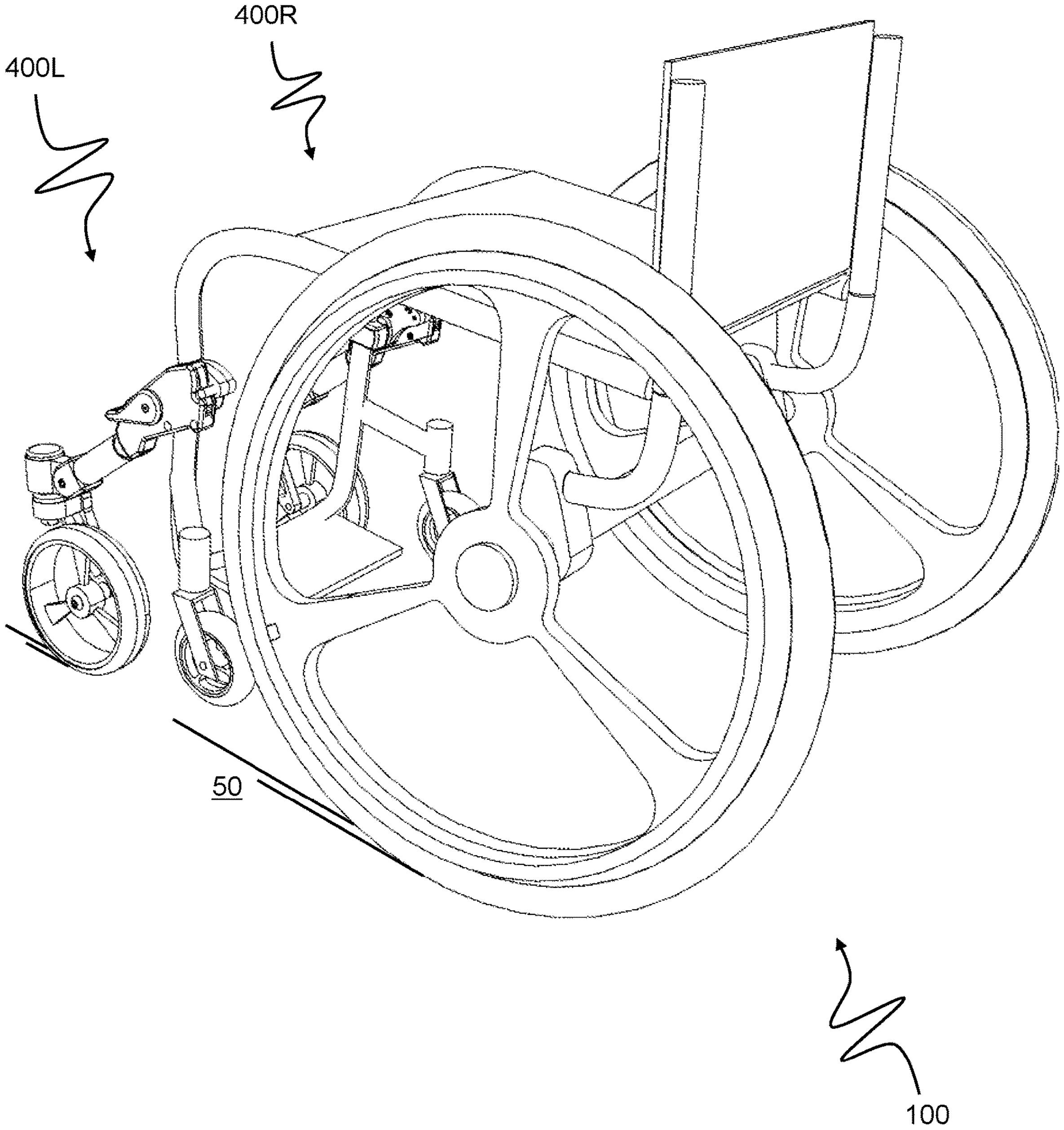
Figure 4G:
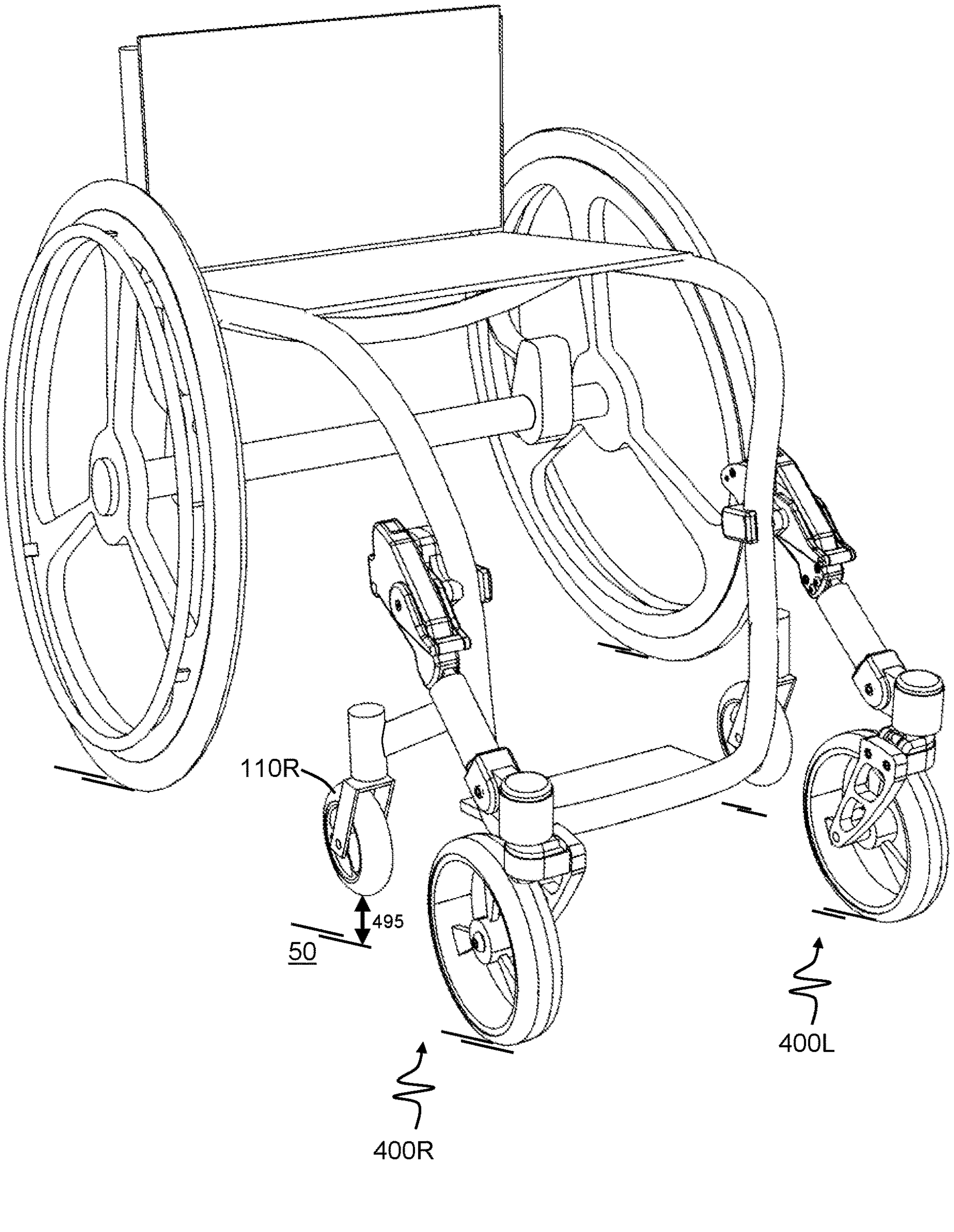

FIGS. 4F-G show close-up views of latching auxiliary wheel apparatus 400L. Lateral retention member 460, visible in FIG. 4F, is adapted to engage with retention groove 260 of mount apparatus 120L (shown in FIG. 2B) upon downward rotation of latching auxiliary wheel apparatus 400L. Lateral tensioning element 470 disposed on switch lever 430 is adapted to compress against clamp portion 217 (shown in FIG. 2A) of mount apparatus 120L in order to reduce side-to-side vibration, wiggle, or play of latching auxiliary wheel apparatus 400L. This arrangement has been found especially useful during deployment, especially while traversing rough terrain and also while traversing surfaces having reduced traction which, in both cases, would otherwise increase the occurrence of oscillatory effects that are common to caster wheel assemblies such as depicted in FIGS. 4A-5B. In FIG. 4G, gap 495 is indicated between front caster wheel 110R and ground surface 50, during deployment of latching auxiliary wheel apparatuses 400L and 400R, having wheelchair 100 substantially reclined as auxiliary wheel apparatuses 400L and 400R support a forward portion of a load being carried by wheelchair 100.

Figure 5A:
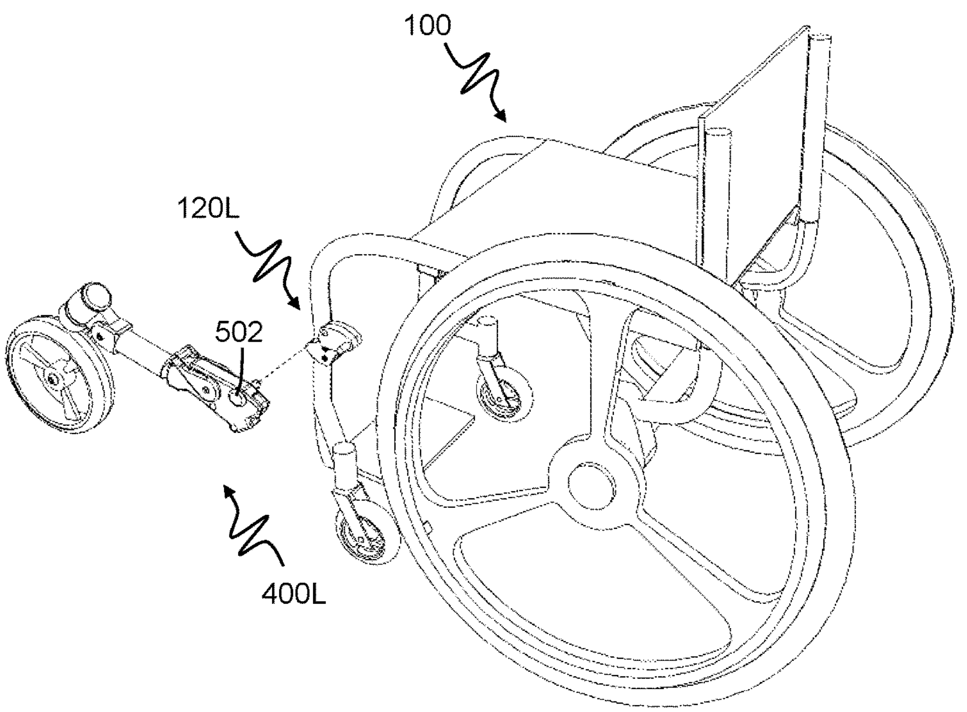
FIGS. 5A-B show an alternative embodiment of the latching-type implement having a ball-detent pin adapted for retention and quick-release of the latching-type implement relative to the mount apparatus.
Figure 5B:
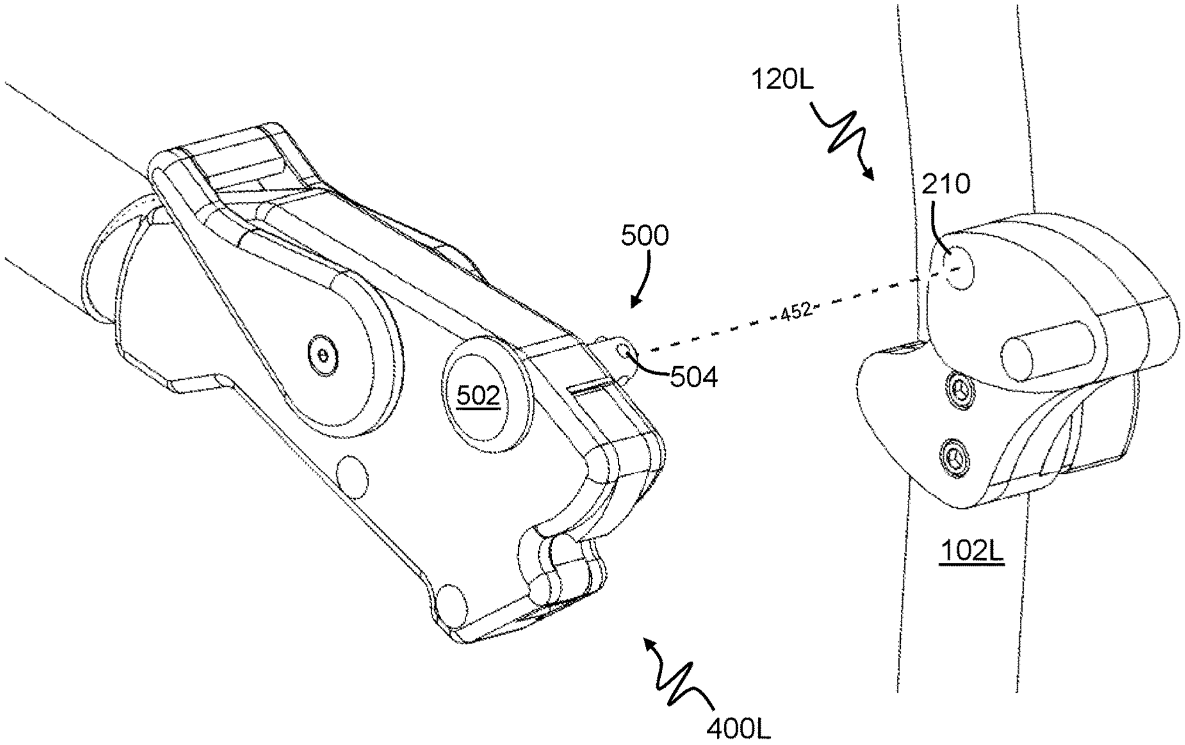

FIGS. 5A-B depict an alternative embodiment, having latching auxiliary wheel apparatus 400L configured with quick-release ball detent pin 500 comprising quick-release button 502 and detent ball 504. Upon insertion of quick-release ball detent pin 500 into forward receiver hole 210 along forward lateral line of insertion 452, detent ball 504 assumes an extended outward position within mount apparatus 120L to ensure lateral retention of latching auxiliary wheel apparatus 400L during and following its deployment, after which the user may depress quick-release button 502 to effectuate retraction of detent ball 504 in order to withdraw quick-release ball detent pin 500 from forward receiver hole 210 and thus to separate latching auxiliary wheel apparatus 400L from mount apparatus 120L.

Figure 6A:
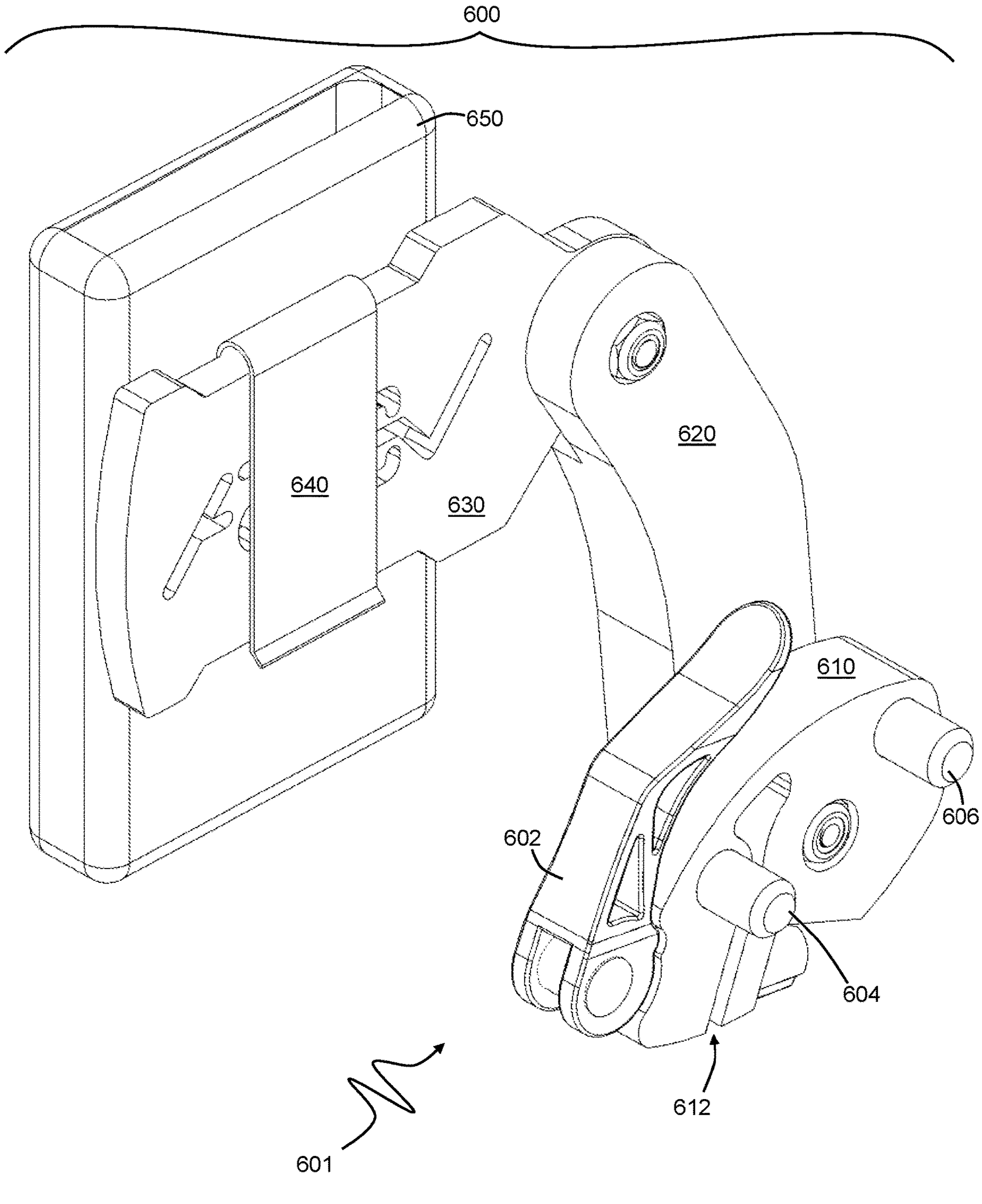
FIGS. 6A-D show a cam clamp-type belt clip adapter implement being connected to the mount apparatus.
Figure 6B:
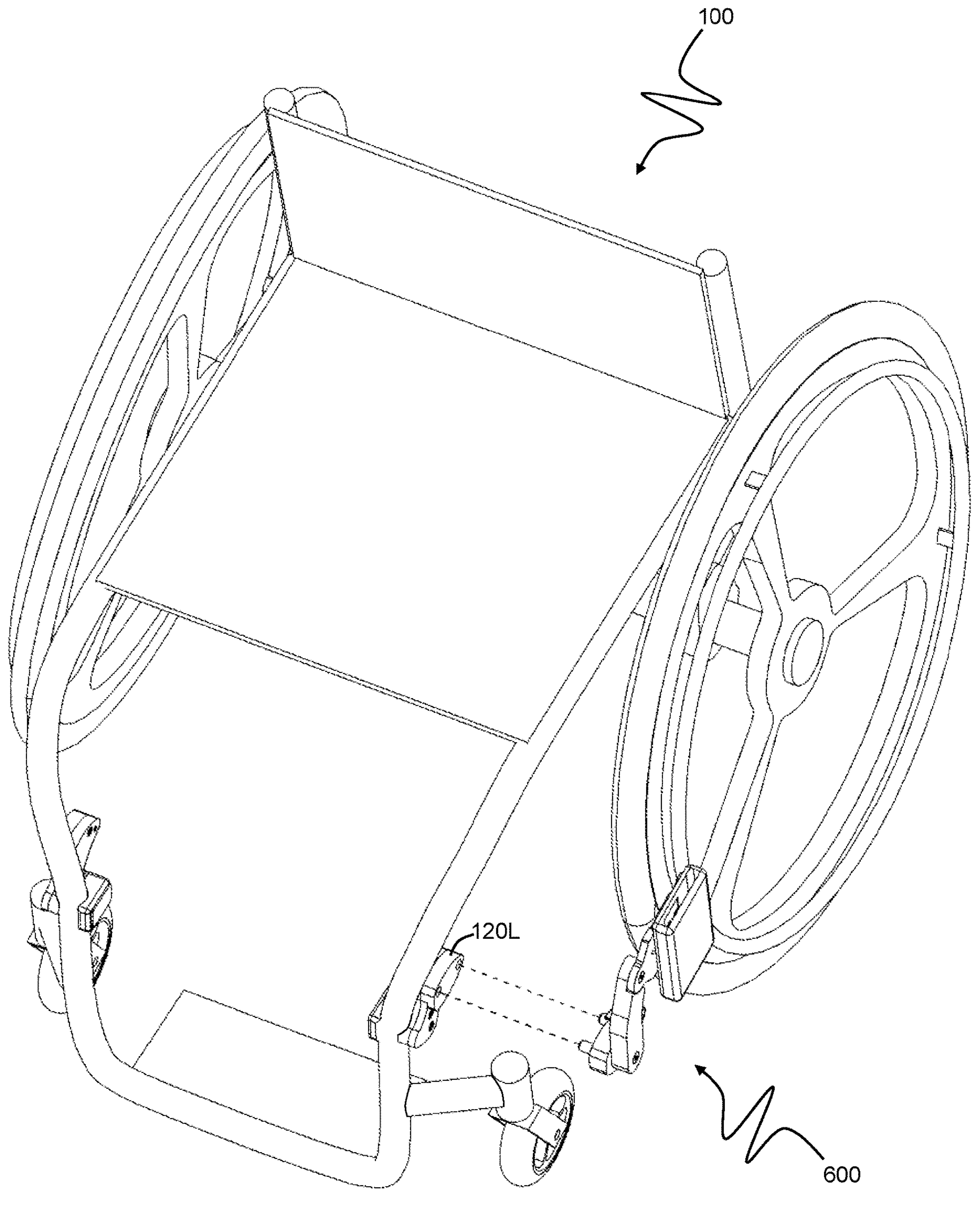

In FIGS. 6A-B, belt clip adapter 600 comprising cam clamp coupler 601 and having carrying device 650 connected to adapter body 630 via belt clip 640 is shown decoupled from mount apparatus 120L. Cam clamp coupler 601 is capable of coupling with mount apparatus 120L by insertion of grip pins 604 and 606 into rear receiver hole 212 and forward receiver hole 210 respectively. Cam clamp notch 612, establishes a joint which enables relative movement of opposing regions of cam clamp body 610 situated on opposing sides of cam clamp notch 612. Other embodiments may, alternatively, comprise a pivotable joint disposed on a cam clamp body to, similarly, enable relative movement of opposing regions of the cam clamp body; in either case, relative movement of the opposing regions of the cam clamp body effectuates a change in the amount of friction grip achieved between the pins during coupling with the receiver holes of the mount apparatus.

Cam lever 602 is capable of selectably drawing opposing portions of cam clamp body 610 closer together to draw forward grip pin 606 and rear grip pin 604 closer together, in effect increasing the friction grip of the forward and rear grip pins 606 and 604 while fully inserted into forward and rear receiver holes 210 and 212 of mount apparatus 120L to enable play-free, secure connection of belt clip adapter 600 to mount apparatus 120L.

Cam lever 602 is also capable of selectably permitting opposing portions of cam clamp body 610 (on opposing sides of cam clamp notch 612) to move further apart to permit forward grip pin 606 and rear grip pin 604 to move further apart, in effect decreasing the friction grip therebetween to enable disconnection of belt clip adapter 600 from mount apparatus 120L.

Figure 6C:
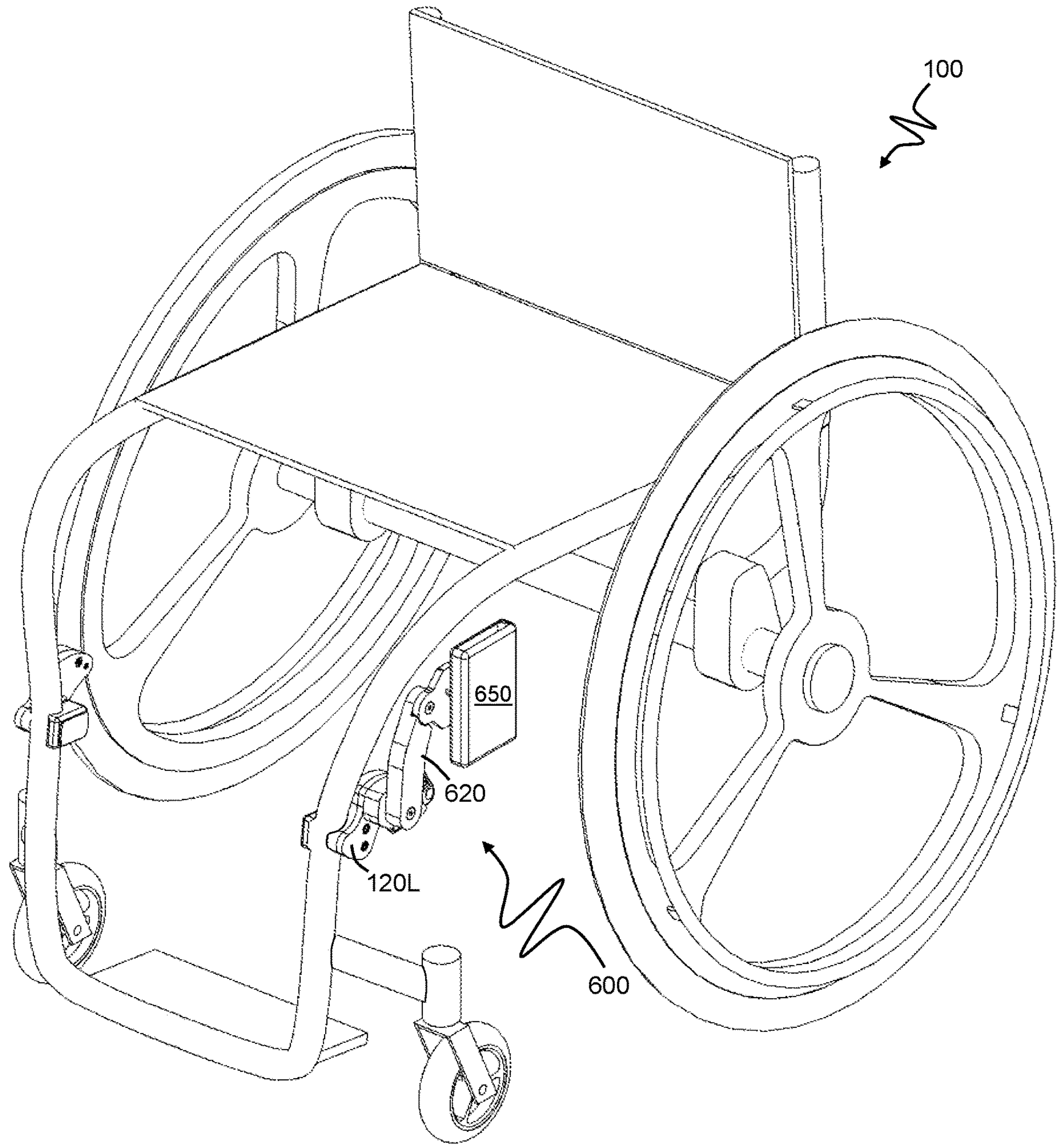

In FIG. 6C, belt clip adapter 600 is shown coupled with mount apparatus 120L, with carrying device 650 clipped onto adapter body 630 using belt clip 640 of carrying device 650.

Figure 6D:
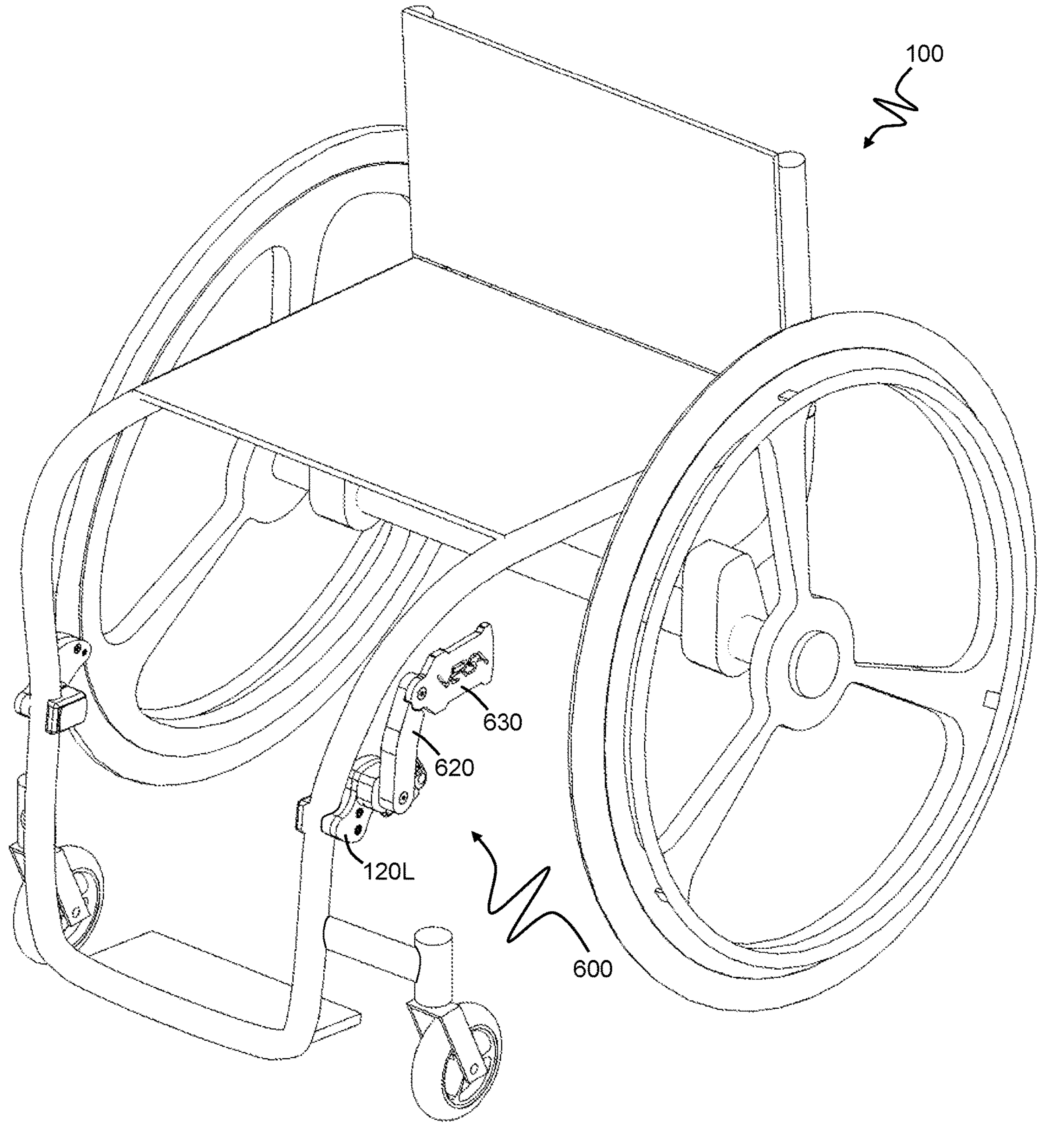

FIG. 6D shows belt clip adapter 600 coupled with mount apparatus 120L and having adapter body 630 devoid of any attachable accessory devices. A beneficial result of the substantial length of adapter arm 620 is that, during attachment of belt clip adapter 600 to mount apparatus 120L, adapter body 630 is disposed in a location that is easily within reach for a seated occupant of wheelchair 100 to facilitate attachment and removal of an accessory device.

Figure 7A:
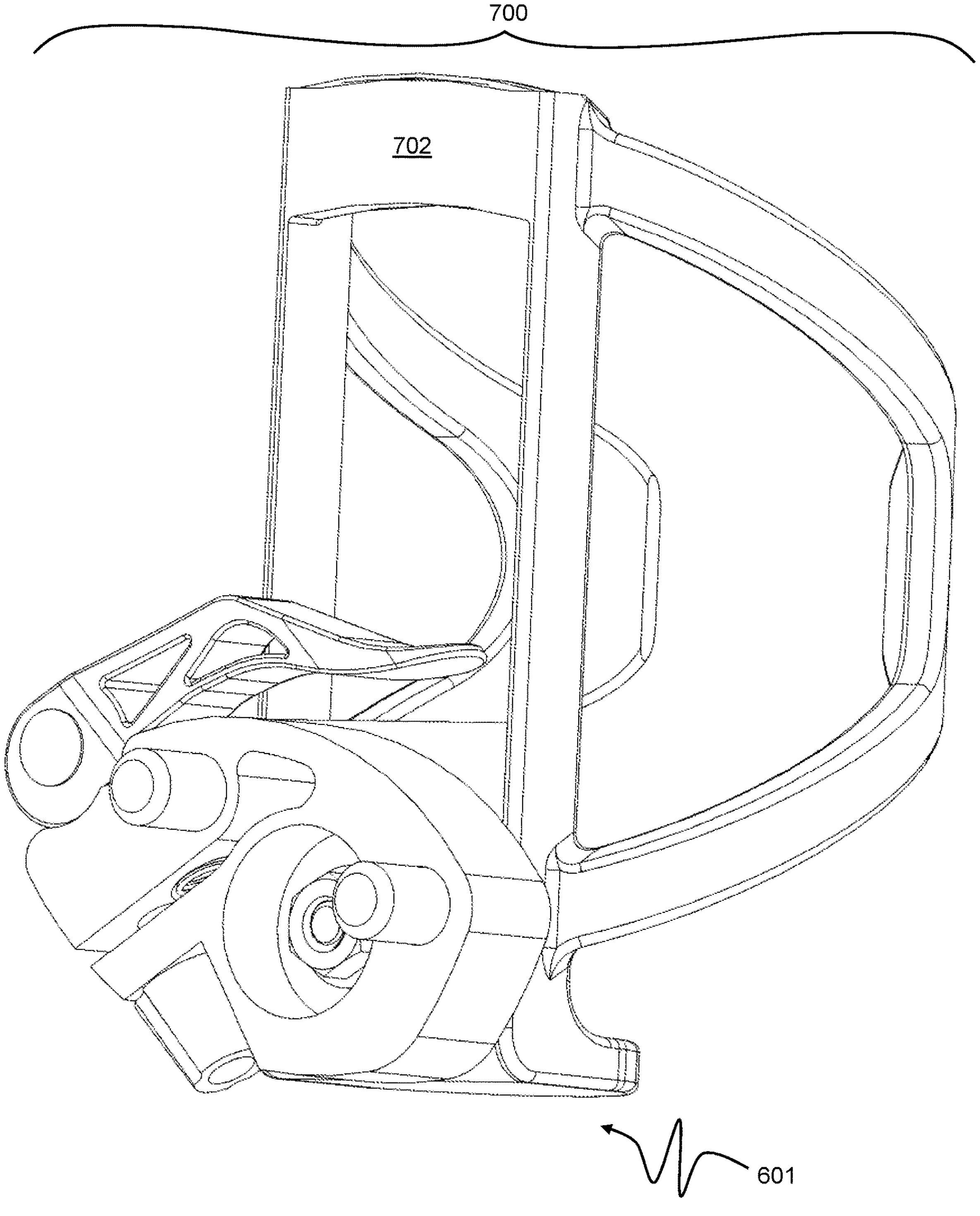
FIGS. 7A-C show a cam clamp-type bottle holder implement being connected to the mount apparatus.
Figure 7B:
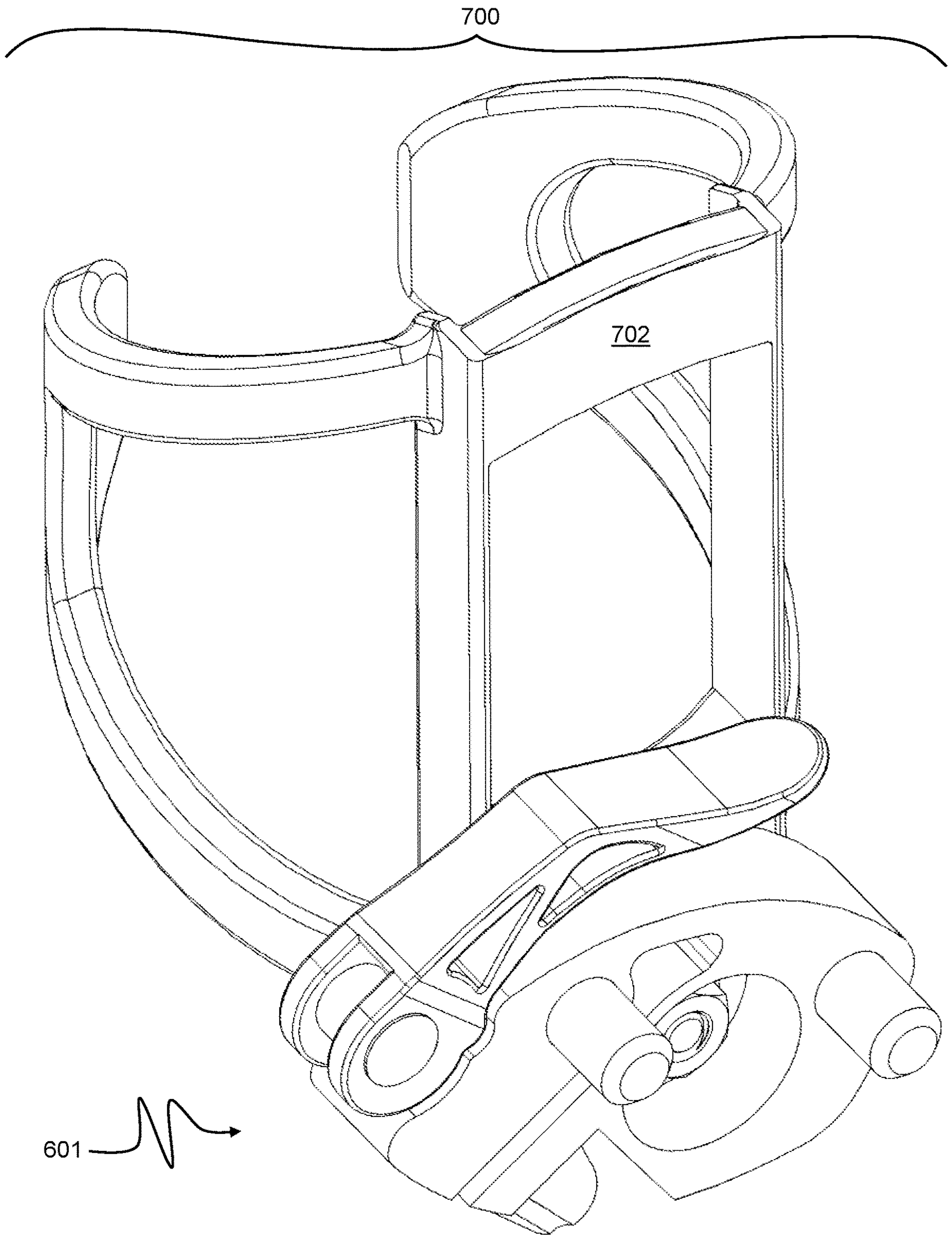
Figure 7C:
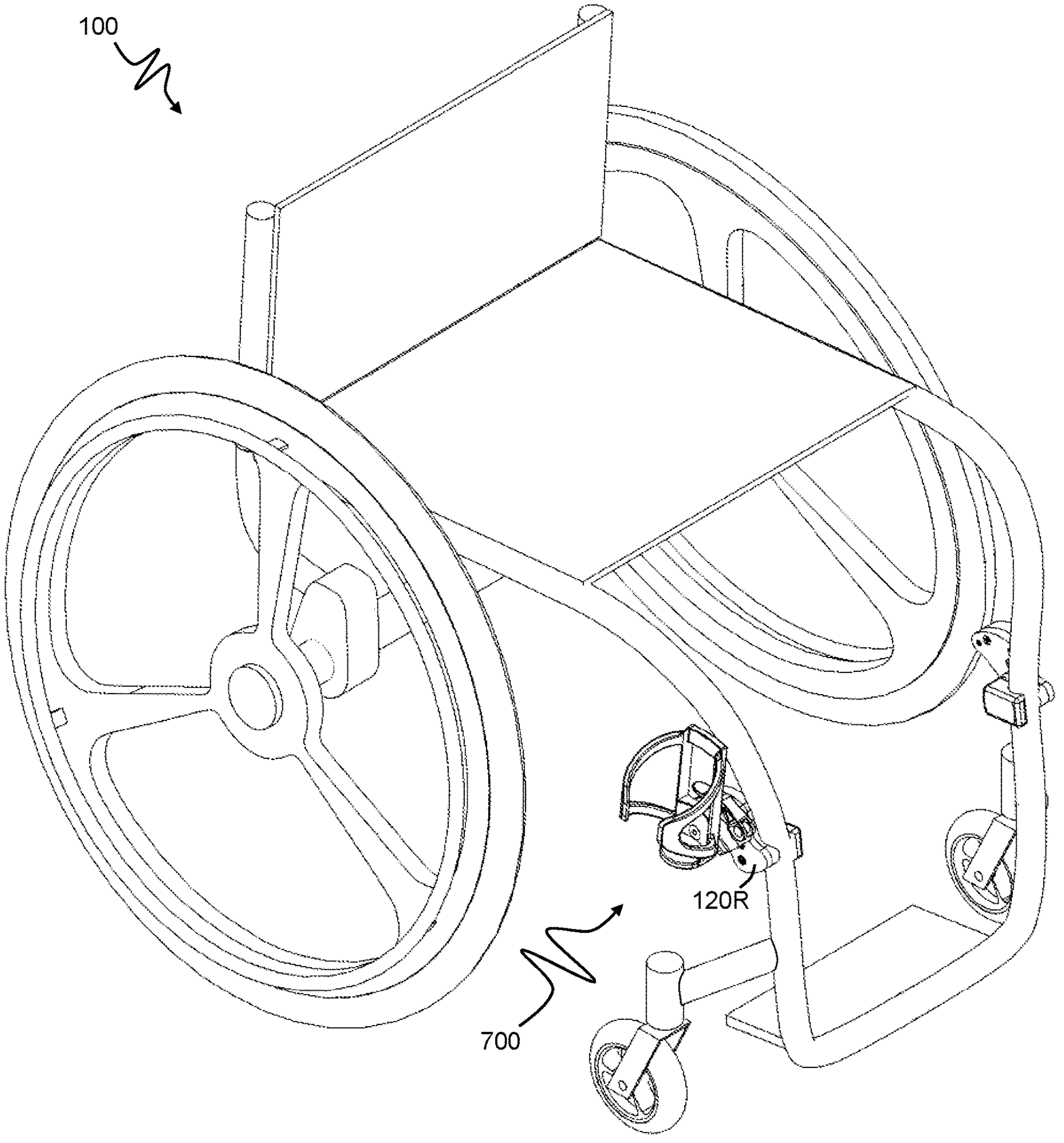

FIG. 7A-B show bottle holder assembly 700, comprising cam clamp coupler 601 and bottle cage 702, detached from any mount apparatus. FIG. 7C show bottle holder assembly 700 attached to mount apparatus 120R to dispose bottle cage 702 within comfortable reach for a seated occupant of wheelchair 100.

Figure 8A:
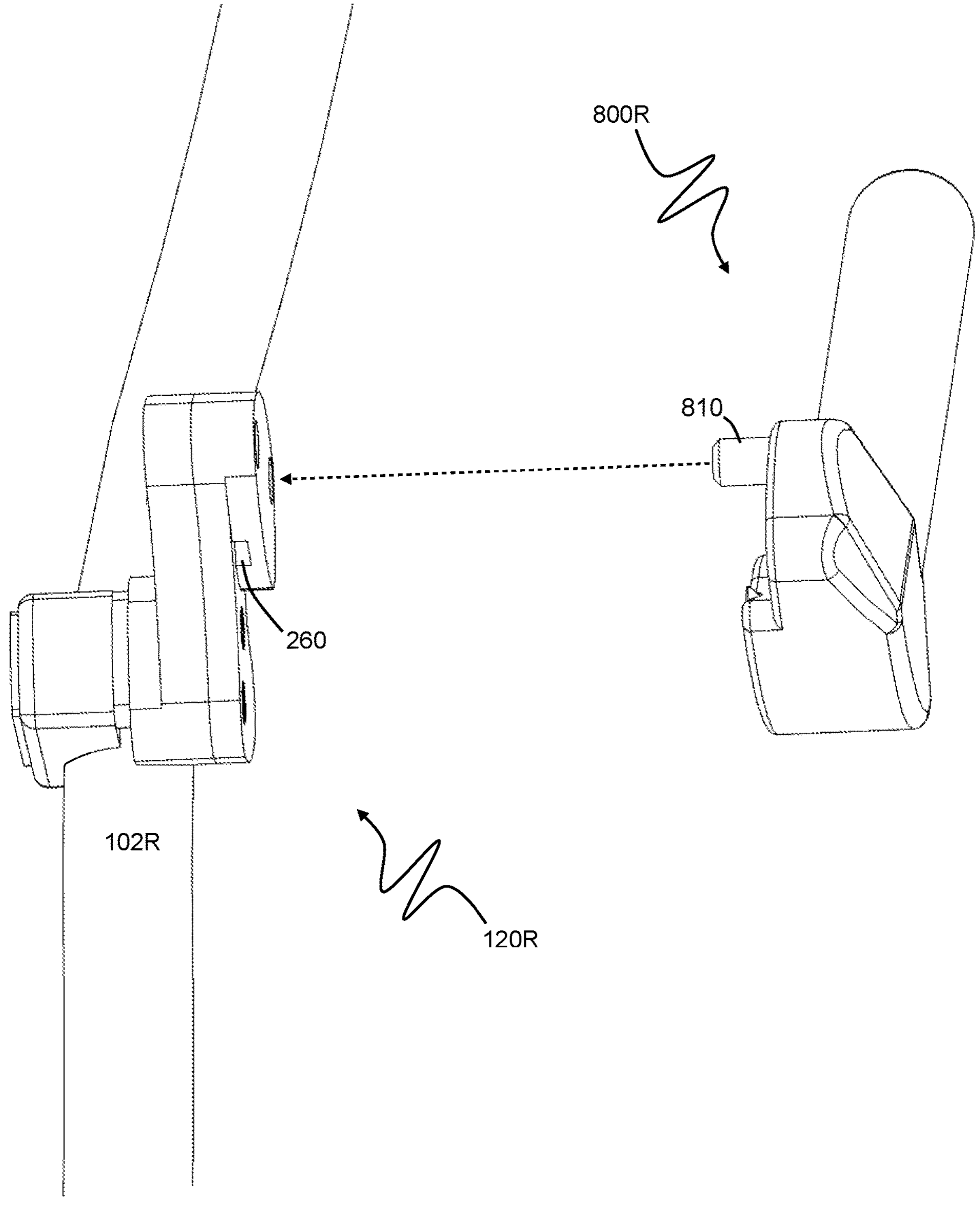
FIGS. 8A-D show a gravity-engaging-type luggage carrier implement being connected to and rotationally engaged with the mount apparatus.
Figure 8B:
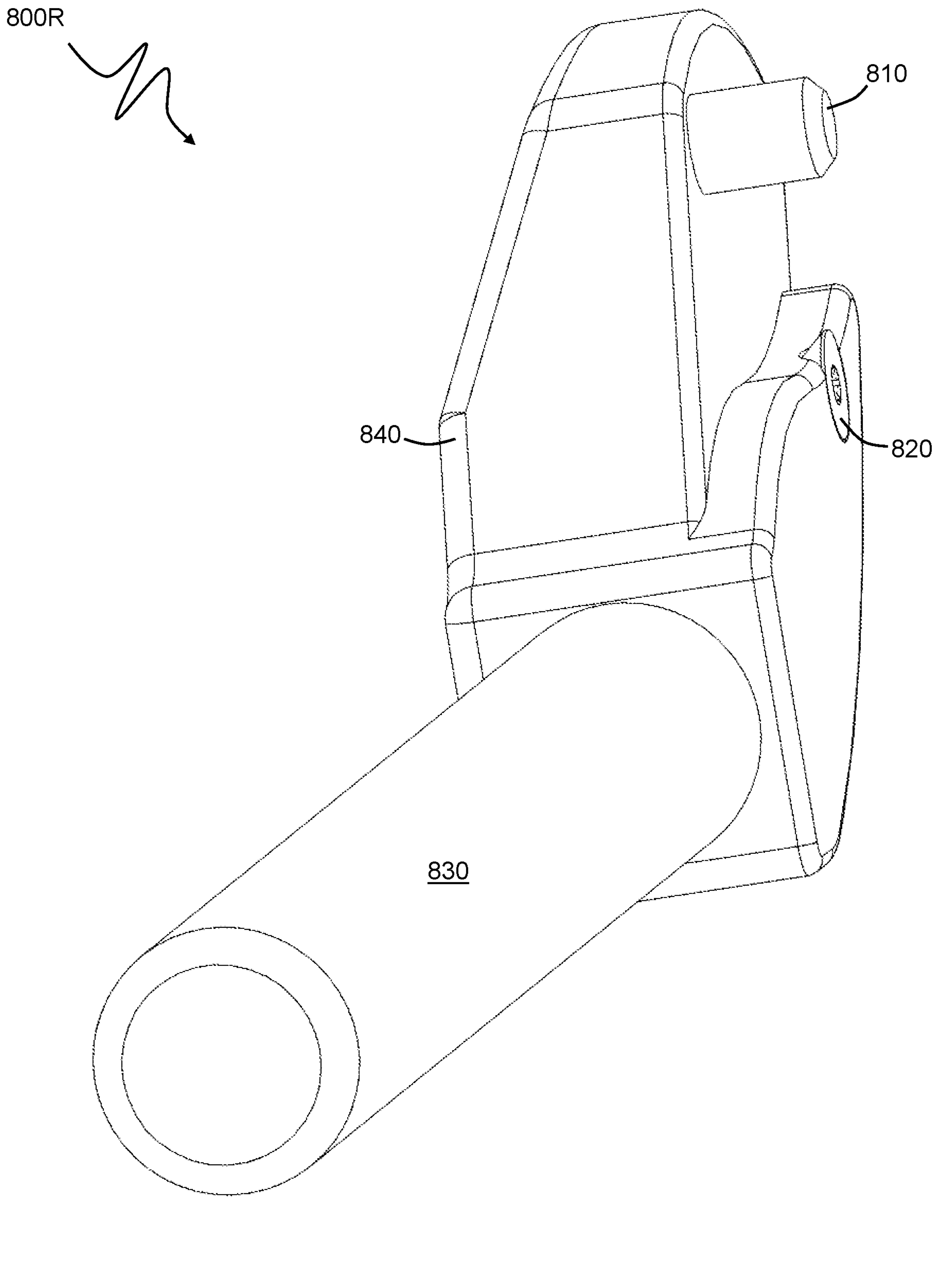
Figure 8C:
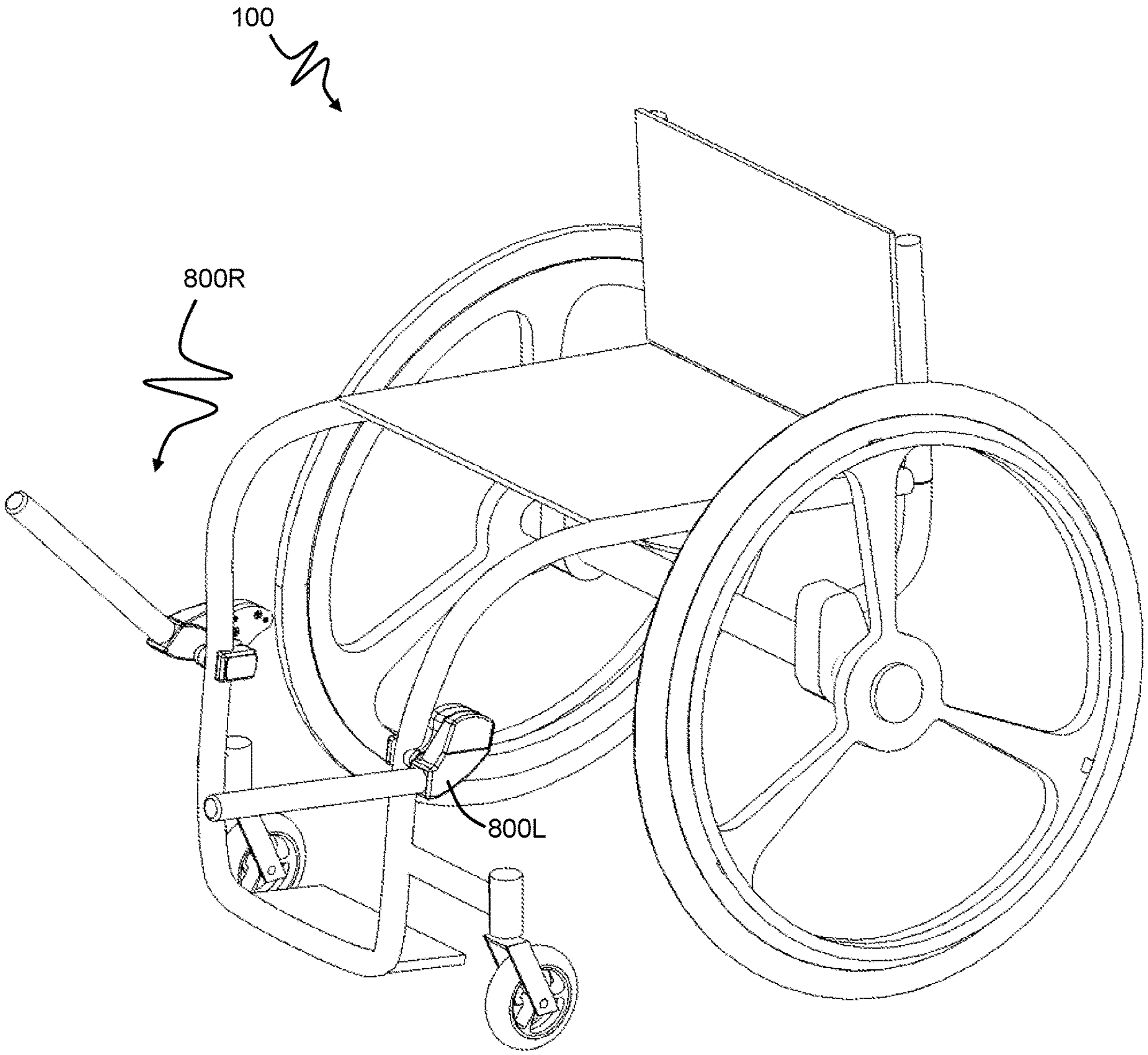
Figure 8D:
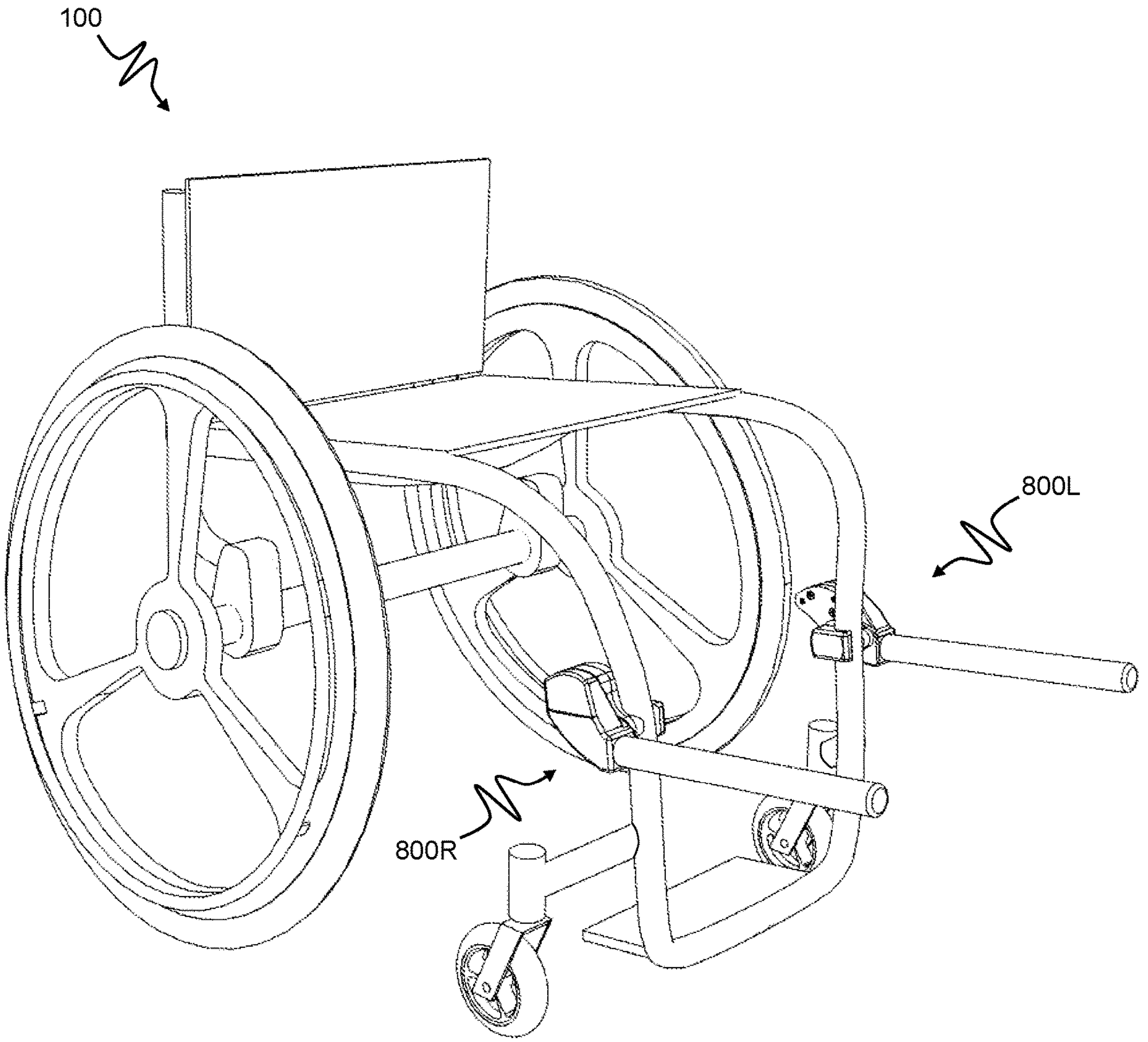

In FIG. 8A, luggage carrier assembly 800R is shown ready for connection to mount apparatus 120R by insertion of rotary insertion pin 810 into forward receiver hole 210 of mount apparatus 120R. FIG. 8B shows a close-up view of luggage carrier assembly 800R, which comprises rotary insertion pin 810, retention member 820, support arm 830, and luggage carrier body 840 Upon connection, downward rotation of support arm 830 and luggage carrier body 840, as shown in FIG. 8C, effectuates engagement of retention member 820 with retention groove 260 (not visible, but shown in FIG. 2B) of mount apparatus 120R, which inhibits outward lateral movement of luggage carrier assembly 800R relative to mount apparatus 120R during deployment of luggage carrier assembly 800R. In FIG. 8D, wheelchair 100, outfitted with symmetrically-opposing mount apparatuses 120L and 120R, is shown having symmetrically-opposing luggage carrier assemblies 800L and 800R deployed and ready to support a forward weight such as that of an article of luggage.

Figure 9A:
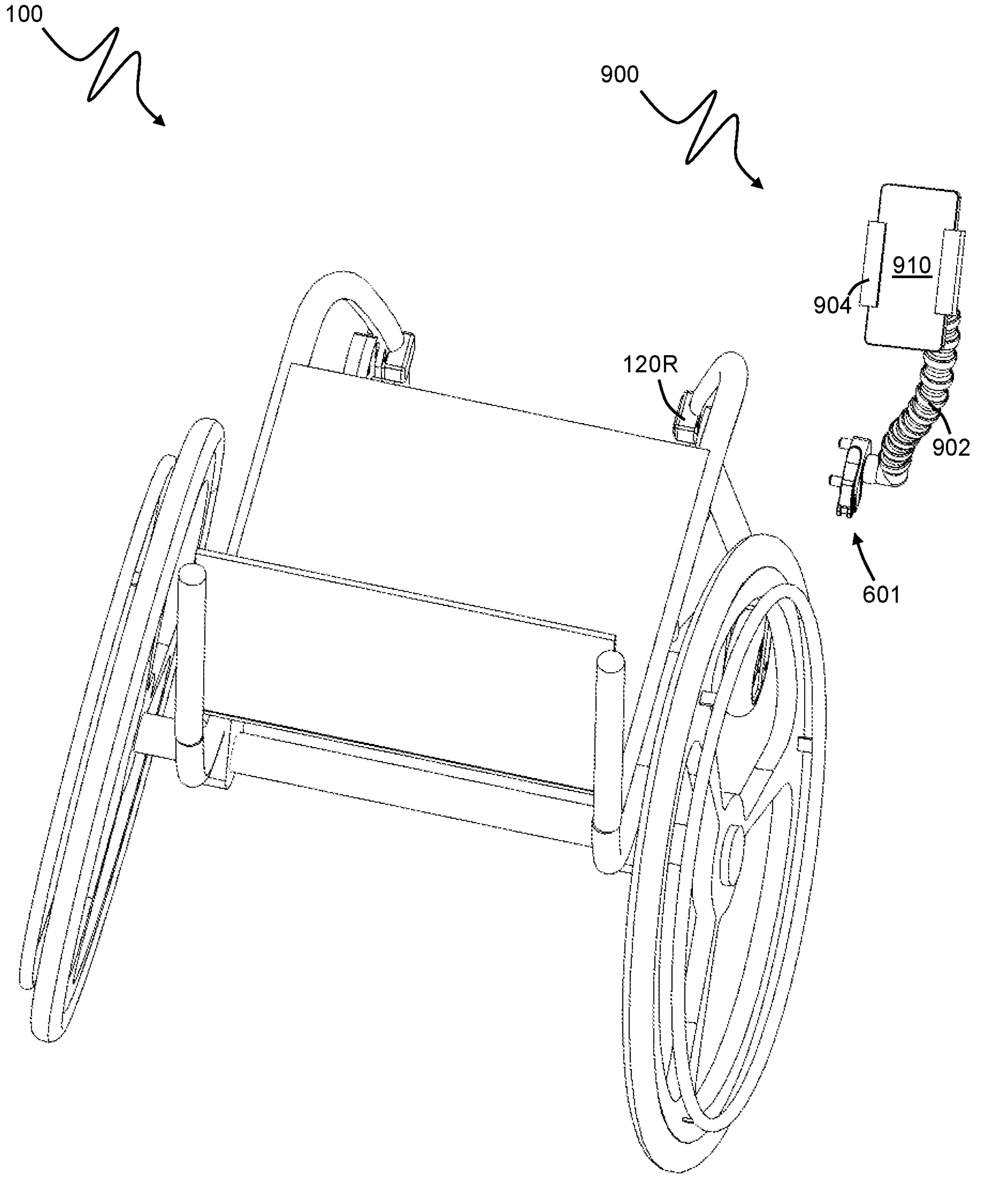
FIGS. 9A-B show a flexible arm with an electronic device holder, capable of being connected to the mount apparatus by utilizing a cam clamp coupler.
Figure 9B:
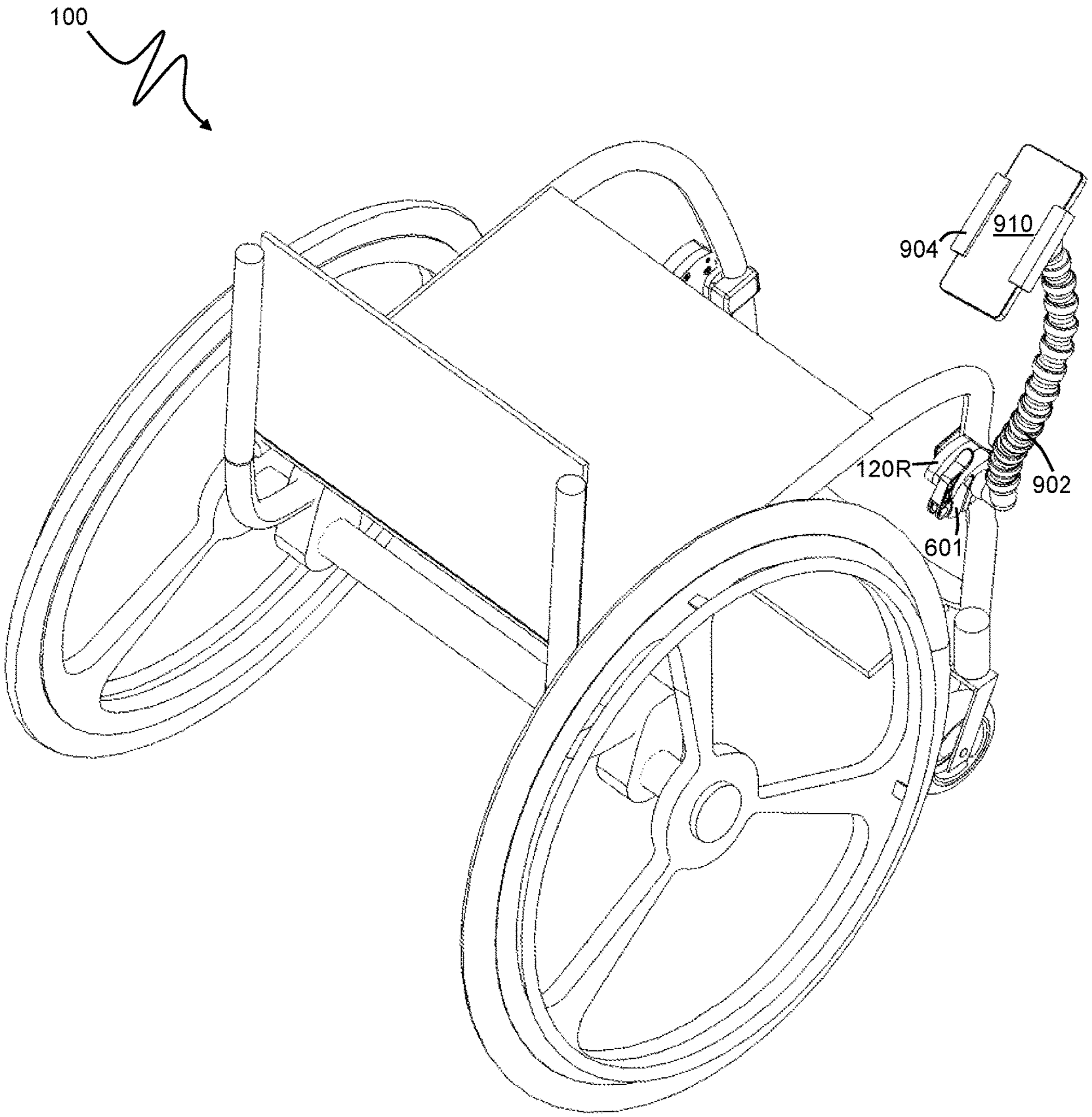

FIG. 9A shows electronics device holding apparatus 900, comprising segmented flexible arm 902 interposed between cam clamp coupler 601 and holder 904, before being connected to mount apparatus 120R. FIG. 9B shows electronics device holding apparatus 900 connected to mount apparatus 120R, with segmented flexible arm 902 arranged so as to dispose portable electronic device 910 in an elevated location to provide convenient access and viewing of portable electronic device 910 for a seated occupant of wheelchair 100.

Figure 10:
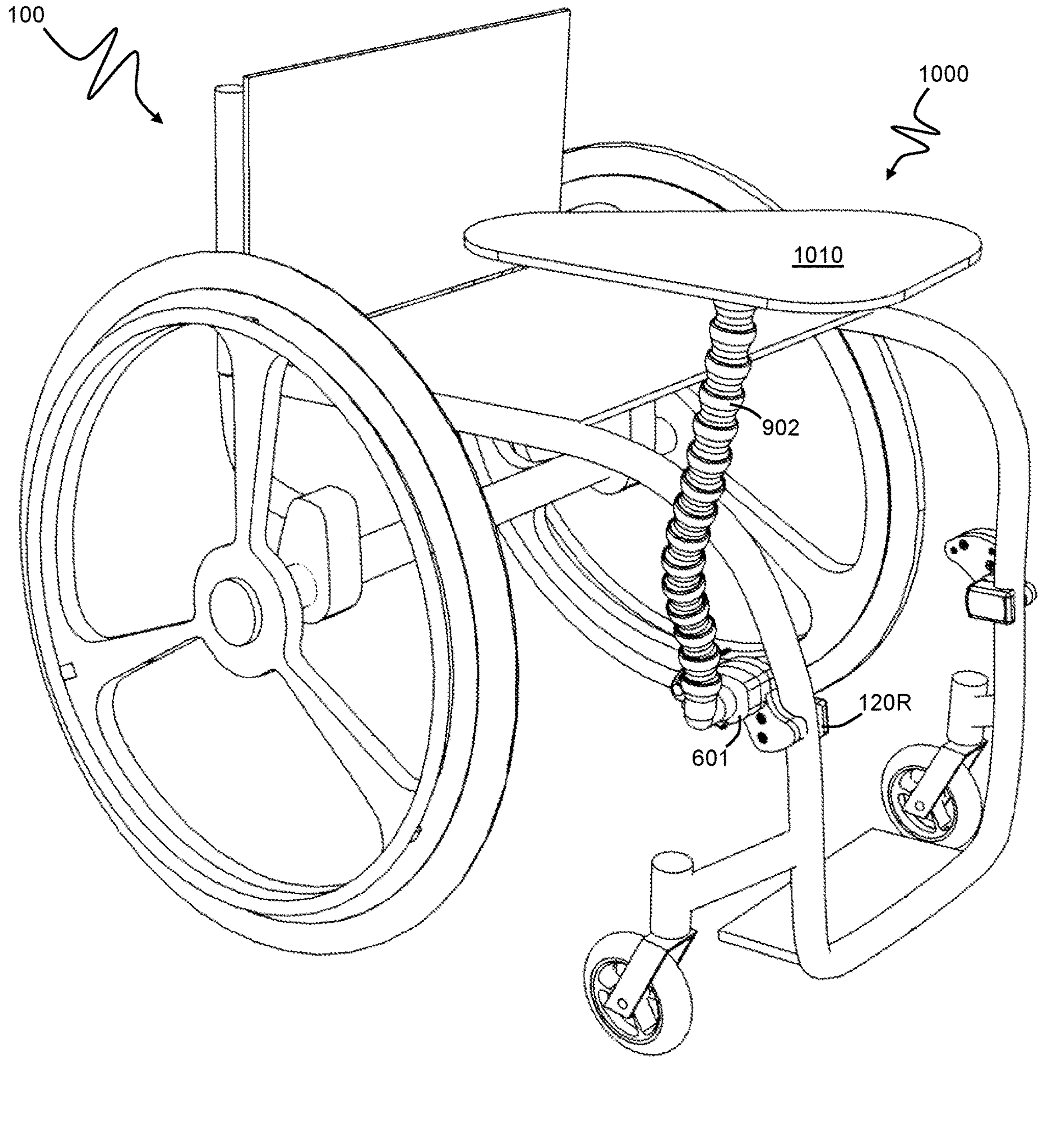
FIG. 10 shows a flexible arm with a support tray, capable of being connected to the mount apparatus by utilizing a cam clamp coupler.

FIG. 10 shows support tray apparatus 1000 connected to mount apparatus 120R, with segmented flexible arm 902 arranged so as to dispose support tray 1010 in an elevated location to provide convenient access of support tray 1010 for a seated occupant of wheelchair 100.

Figure 11A:
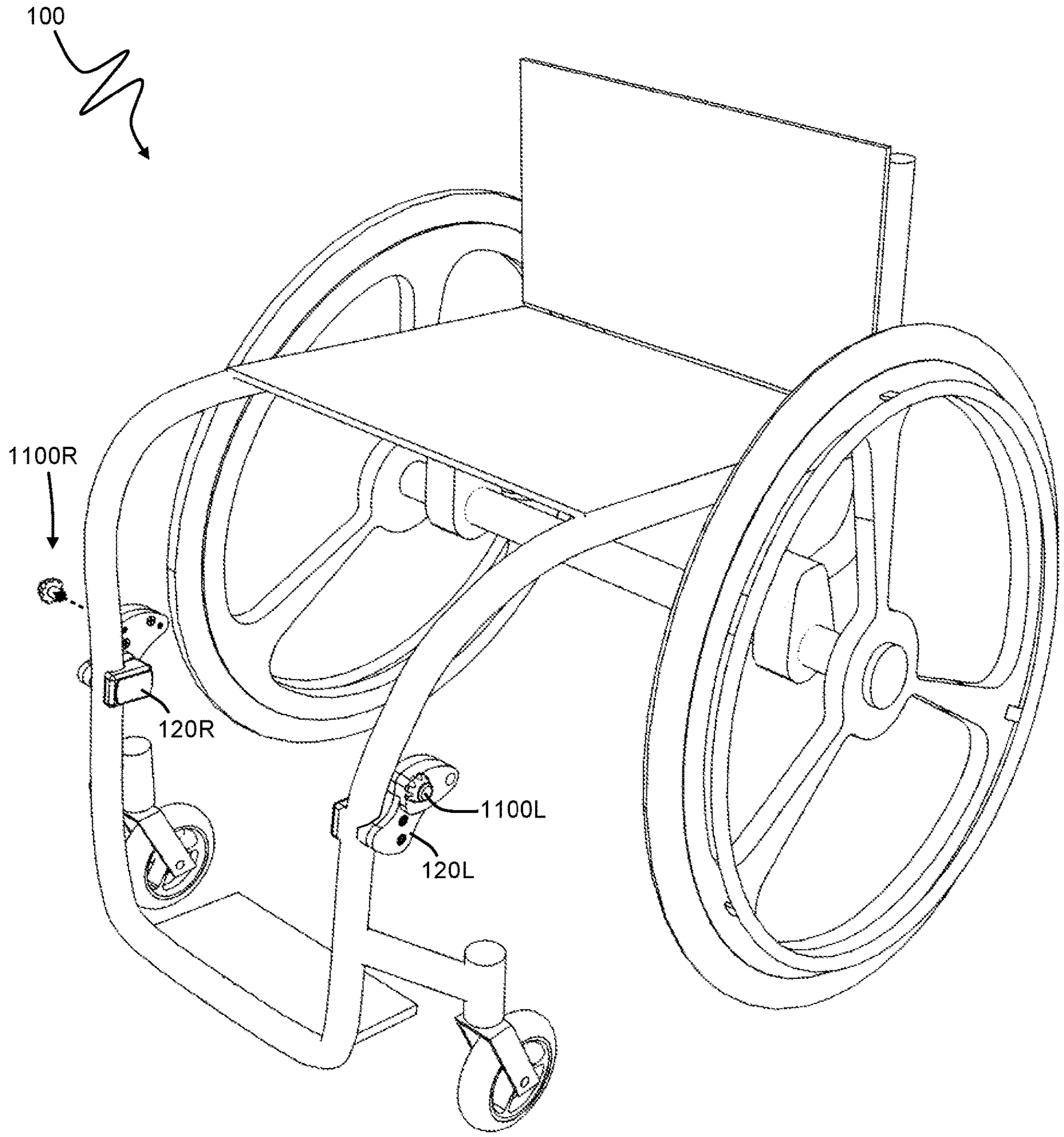
FIGS. 11A-B show a magnetically-connecting-type illumination implement being connected to the mount apparatus.
Figure 11B:
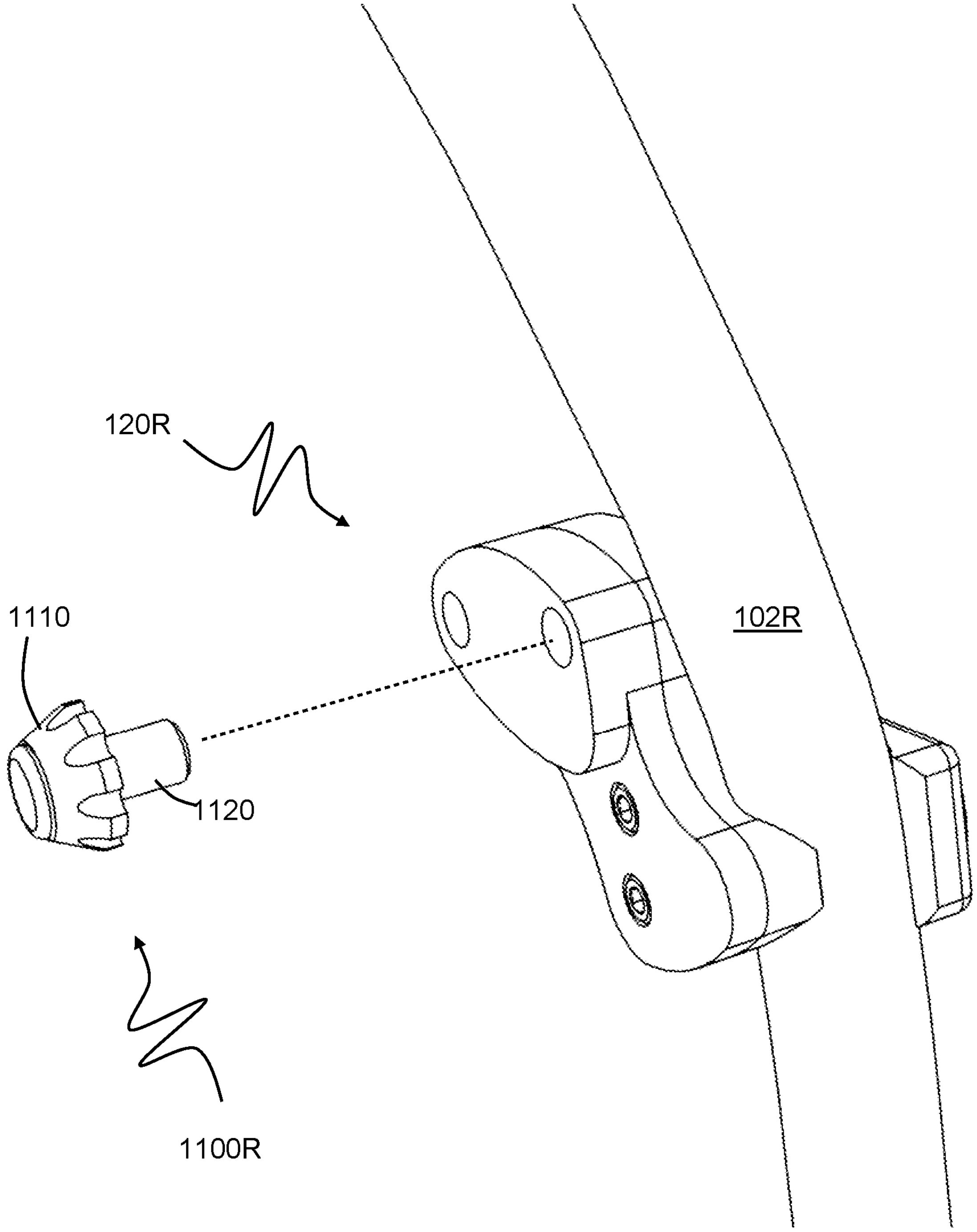

FIG. 11A depicts magnetically-connecting illumination devices 1100L and 1100R, each comprising body 1110 and magnetic insertion pin 1120, being connected to symmetrically-opposing mount apparatuses 120L and 120R. Flashing or continuously-emitting light bulbs or light-emitting diodes (LEDs), for example, disposed on an end region of body 1110 provide illumination for added outdoor nighttime visibility and safety.

As illustrated in the figures and as described above, the mount apparatus has been adapted to play a central role in the relationship between the wheelchair and these and other implements that have been adapted for connection thereto. As such, it may be necessary to adapt the mount apparatus to accommodate geometric constraints and mechanical requirements in order to ensure suitability for a variety of wheelchairs as well as safety and operability by a user, particularly for the user who is regularly seated in the wheelchair for mobility and while performing activities of daily living.

First, it may be necessary to adapt the mount apparatus to constraints imposed by the design and construction of the wheelchair, such as tube diameter, frame geometry, and location of other structures such as caster wheel assemblies, wheel locks, weld joints, clamp joints, bolts, screws, and the like. Angular compensation, to place an outer surface of the mount apparatus in a substantially vertical orientation, may be achieved without departing from the spirit and scope of the invention, for example, by incorporating a tube shim or a combination of a face plate and angled clamp, or with a combination of an angle-adjustable face plate and a straight clamp.

Second, it may be necessary to adapt the mount apparatus to constraints imposed by the manner in which the wheelchair is used, such as where the user's hands, arms, torso, legs, and feet make purposeful, intentional contact with inboard and outboard surfaces of the wheelchair. For example, it is important to consider that the user engages in contact with the frame and other structures of the wheelchair while shifting his or her body weight, both while occupying the wheelchair and while transferring into and out of the wheelchair.

Third, it may be necessary to adapt the mount apparatus to constraints imposed by the location at which the user's body passively makes contact with surfaces of the wheelchair as a consequence of occupying the wheelchair. For example, it is important to consider that the user's body may make contact with specific inboard regions of the frame for prolonged periods of time, such as where the outer surfaces of a user's legs contact the inboard surfaces of the front of the frame of the wheelchair and which, if left unchecked, may possibly cause skin breakdown. It would therefore be dangerous to outfit a wheelchair with a mount apparatus in a manner which makes such an occurrence likely or in a manner which exacerbates an existing issue negatively impacting the user's skin integrity.

Fourth, it may be necessary to adapt the mount apparatus to constraints imposed by the user's ability to reach and to safely and comfortably operate implements adapted to be connected to the mount apparatus, which may be impacted by his or her size, range of motion, flexibility, and willingness to perform the actions necessary to manually connect and disconnect the chosen accessory devices. Such adaptations, without departing from the spirit and scope of the invention, may include the specific location of the frame of the wheelchair at which the mount apparatus is disposed as well as the lateral, longitudinal, and vertical positioning of the outer lateral surface and the receiver holes.

Last, various adaptations may be necessary to ensure the overall strength, durability, and utility of the mount apparatus, which may depend on factors such as the user's weight, the manner and frequency in which the mount is used, which implements are to be used in conjunction with the mount apparatus, and lateral retention means being utilized during connection and deployment of an implement relative to the wheelchair in a predetermined orientation.

EXAMPLE

In the context of using a manual wheelchair, it has been discovered through experimentation that a useful arrangement includes a pair of mount apparatuses adapted to be rigidly and semi-permanently clamped to symmetrically-opposing forward lateral portions of the wheelchair.

A pair of mount apparatuses, substantially similar in construction to those depicted in the drawings, were secured to a Tilite TR wheelchair having 1.0" diameter frame tubes. The two symmetrically-opposing front frame portions or "downtubes" onto which the mount apparatuses were clamped project outward in the forward direction at an angle of 5 degrees relative to vertical so that the footrest of the wheelchair extends out beyond any upper regions of the front frame portions. The front frame portions are also tapered in the lateral direction, at an inward angle of 6 degrees, down toward the footrest.

Accordingly, inside and outside interior clamp portions were modeled using computer-aided design (CAD) software to fit precisely over the front frame portions of the wheelchair and were configured to compensate for the aforementioned deviations from vertical due to the front frame angle and inward taper of the front frame portions of the wheelchair. The inside and outside interior clamp portions were fabricated, using fused filament fabrication (3D printing), out of carbon fiber-impregnated nylon. The inside and outside exterior clamp portions were also modeled using computer-aided design software and were machined out of 6061 aluminum and 7075 aluminum, respectively, using a computer numeric controlled (CNC) milling machine.

Both mounts comprise a front lateral receiver hole and a rear lateral receiver hole, both directed substantially perpendicular to a longitudinal frame portion of the wheelchair, the lateral receiver holes being spaced apart 1.50" (38.1 mm). The front and rear lateral receiver holes are each capable of receiving a 0.375" (9.53 mm) dowel pin. To improve insertion and removal of a 0.375" pin yet maintain a secure, substantially play-free connection, it was found effective to dimension a receiver hole slightly larger, such as with a diameter of 0.377" (9.576 mm) or 0.386" (9.804 mm). These dimensions must also take into account any anodizing finish being applied for enhanced strength, corrosion resistance, and aesthetic appeal.

The lateral receiver holes may be utilized individually for connecting a small device, such as battery-powered LED flashlight, a blinking or strobing light, or a safety reflector.

The lateral receiver holes have also been utilized in tandem for connecting devices to the mount, the devices having a multiple-pin construction wherein two pins insert simultaneously into the lateral receiver holes of the mount. A tight friction-fit was achieved, for example, in the case of a water bottle holder attachment, wherein there was sufficient lateral retention relative to the mount; however, lateral retention utilizing a double-pin attachment method has been greatly improved by including magnetic capabilities so that the end of one or both of the pins is capable of magnetic attraction to an element disposed inside its respective lateral receiver hole.

Lateral retention of other accessory devices, as well as the water bottle holder, was improved by including a lever-actuated cam clamp which, by rotating the lever towards a locked orientation, enabled the user to effectuate clamping or tensioning between the two pins to impart a tight gripping effect between the pins and the inner surfaces of the lateral receiver holes. By having a sufficiently long lever, a user with reduced hand function may be more easily able to tighten and loosen the lever-actuated cam clamp.

Acting as an intermediary connection device, a belt clip adapter has also been created for connection to one of the mounts by utilizing both lateral receiver holes and which enables attachment of a pouch or cargo bag having a clip of the sort that is commonly used for connection of a pouch or cargo bag to a waistbelt.

By including a retention element (a notch machined to a depth of approximately 0.125 inches) on an underside region of the mount, the user is afforded the capability of connecting a downwardly-rotatable implement by inserting a cylindrical insertion pin, disposed on the implement, into a first one of the lateral receiver holes and subsequently lowering the accessory device to a predetermined orientation. A flange element disposed on the accessory device achieves contact with the retention element disposed on the mount to inhibit lateral movement of the accessory device relative to the mount. Such capability has proven useful for the attachment of dual (left and right) downwardly-rotatable luggage carriers.

Insertion by the user of stand-alone cylindrical bearing pins into the rear receiver holes of both the left- and the right-side mount apparatuses may be followed by connection of a pair of ground-contacting implements, such as all-terrain wheel attachments, by insertion into the forward receiver holes and subsequent downward rotation of the pair of ground-contacting implements toward a predetermined orientation to engage a latch element of each of the ground-contacting implements with the stand-alone cylindrical bearing on its respective side of the wheelchair. An exemplary configuration may include a load-transitioning latch mechanism comprising a spring and a latch, the latch being capable of establishing releasable load-bearing engagement with the stand-alone cylindrical bearing pin. This arrangement is especially useful in the case of dual (left and right) laterally-attaching all-terrain wheel attachments which, by virtue of a compact latch mechanism, have been kept small, lightweight, strong, and mechanically stable while traveling over very rough terrain; such an arrangement enables fast and easy attachment, deployment, disengagement, and detachment of the pair of implements by the user in a simultaneous fashion.

Displacing the stand-alone cylindrical bearing pins from the mount apparatus to transition the mount apparatus to its vacated configuration, the user enjoys the normal function of the wheelchair without hindrance, as opposed to earlier inventions concerned with the attachment of auxiliary equipment to wheelchairs. In particular, the substantial distance between the user's hands and the mount apparatuses during steering and propelling of the wheelchair provides sufficient clearance to ensure that scrapes to the hand or injuries to the fingers do not occur. Further, its sleek form, devoid of any laterally-projecting elements, has prevented contact from occurring between the mount apparatus and household goods and personal effects such as furniture, cabinetry, bedding, clothing, or other items capable of becoming scratched, gouged, dented, snagged or torn by elements that would otherwise project substantially from the wheelchair. The user has thus benefitted from the versatility, convenience, and safety offered by the transformative capabilities of the mount apparatus.

I claim:

1. A mount apparatus for releasable connection of an attachable implement to a wheelchair, the wheelchair having a central vertical longitudinal plane passing therethrough, the wheelchair comprising left and right forward lateral frame portions disposed on opposite sides of the central vertical longitudinal plane, the mount apparatus being adapted to remain secured to one of the left and right forward lateral frame portions of the wheelchair, the mount apparatus being adapted to maintain a displaceable bearing member in a predetermined load-bearing position, the displaceable bearing member being separate from the attachable implement, the displaceable bearing member being capable of displacement from the predetermined load-bearing position, wherein, having the displaceable bearing member in the predetermined load-bearing position, the mount apparatus enables load transmission between the attachable implement and the wheelchair during connection of the attachable implement to the wheelchair.

2. The mount apparatus of claim 1 wherein enabling load transmission between the attachable implement and the wheelchair enables weight to be supported through the mount apparatus and the attachable implement.

3. The mount apparatus of claim 1 comprising an aperture adapted to maintain the displaceable bearing member in the predetermined load-bearing position.

4. The mount apparatus of claim 1 wherein, while the displaceable bearing member is maintained in the predetermined load-bearing position, the displaceable bearing member is capable of load-bearing to enable rotary deployment of the attachable implement.

5. The mount apparatus of claim 1 wherein releasable connection of the attachable implement to the wheelchair is achieved by insertion of a round bearing of the attachable implement into an aperture.

6. The mount apparatus of claim 5, the round bearing of the attachable implement being cylindrical.

7. The mount apparatus of claim 1, further comprising an outer lateral surface of uniform distance from the central vertical longitudinal plane passing through the wheelchair, wherein having the displaceable bearing member in the predetermined load-bearing position results in the displaceable bearing member extending outward beyond the outer lateral surface relative to the central vertical longitudinal plane passing through the wheelchair.

8. The mount apparatus of claim 7 wherein displacing the displaceable bearing member from the predetermined load-bearing position results in the outer lateral surface of the mount apparatus assuming a streamlined form wherein the outer lateral surface defines a distance of maximum lateral extension relative to the central vertical longitudinal plane passing through the wheelchair.

9. The mount apparatus of claim 1 wherein displacing the displaceable bearing member from the predetermined load-bearing position results in the outer lateral surface of the mount apparatus assuming a streamlined form wherein the outer lateral surface defines a distance of maximum lateral extension relative to the central vertical longitudinal plane passing through the wheelchair.

10. The mount apparatus of claim 1 being adapted for engagement with the attachable implement in a lateral direction wherein relative movement between the attachable implement and the mount apparatus is inhibited in the lateral direction during connection of the attachable implement to the mount apparatus.

11. The mount apparatus of claim 10, wherein engagement between the mount apparatus and the attachable implement in the lateral direction inhibits vibration of the attachable implement during navigation of the wheelchair.

12. The mount apparatus of claim 11, the attachable implement comprising a pivotable caster wheel assembly, wherein engagement between the mount apparatus and the attachable implement inhibits oscillatory effects of the pivotable caster wheel assembly during navigation of the wheelchair.

13. The mount apparatus of claim 1 being adapted for connection of a latching auxiliary wheel apparatus comprising a pivotable caster wheel assembly.

14. A mount apparatus for releasable connection of an attachable implement to a wheelchair, the wheelchair having a central vertical longitudinal plane passing therethrough, the wheelchair having left and right forward lateral frame portions disposed on opposite sides of the central vertical longitudinal plane, the mount apparatus comprising an outer lateral surface, the mount apparatus being adapted to remain secured to one of the left and right forward lateral frame portions, the mount apparatus being adapted to maintain a displaceable bearing member in a load-bearing position, the displaceable bearing member being separate from the attachable implement, the mount apparatus being capable of assuming 1.) a first configuration with the outer lateral surface defining an outermost lateral extent of the mount apparatus and having the displaceable bearing member displaced from the load-bearing position, and 2.) a second configuration with the displaceable bearing member projecting outward beyond the outer lateral surface and having the displaceable bearing member maintained in the load-bearing position.

15. The mount apparatus of claim 14 wherein maintaining the displaceable bearing member in the load-bearing position enables load transmission between the attachable implement and the mount apparatus.

16. The mount apparatus of claim 14 comprising a lateral surface of uniform distance from the central vertical longitudinal plane passing through the wheelchair.

17. The mount apparatus of claim 14 comprising a first aperture adapted to receive an insertable bearing disposed on the attachable implement.

18. The mount apparatus of claim 17 comprising a second aperture adapted to receive the displaceable bearing member.

19. The mount apparatus of claim 14 being adapted for connection of a latching auxiliary wheel apparatus comprising a pivotable caster wheel assembly.

20. A mount apparatus for releasable connection of a latching auxiliary wheel apparatus to a wheelchair, the wheelchair having a central vertical longitudinal plane passing therethrough, the wheelchair comprising left and right forward lateral frame portions disposed on opposite sides of the central vertical longitudinal plane, the mount apparatus comprising a lateral surface and a displaceable bearing member, the latching auxiliary wheel apparatus comprising a pivotable caster wheel assembly, the mount apparatus being adapted to remain secured to one of the left and right forward lateral frame portions of the wheelchair, the mount apparatus being adapted to maintain the displaceable bearing member in a load-bearing position to enable weight to be supported through the mount apparatus and the latching auxiliary wheel apparatus, the mount apparatus being capable of assuming 1.) a first configuration with the lateral surface defining an outermost lateral extent of the mount apparatus and having the displaceable bearing member displaced from the load-bearing position, and 2.) a second configuration with the displaceable bearing member projecting outward beyond the lateral surface and having the displaceable bearing member maintained in the load-bearing position.

* * * * *